US012065326B2

(12) United States Patent
Ebihara

(10) Patent No.: US 12,065,326 B2
(45) Date of Patent: Aug. 20, 2024

(54) SHEET CONVEYING DEVICE AND IMAGE FORMING SYSTEM INCORPORATING THE SHEET CONVEYING DEVICE

(71) Applicant: Takashi Ebihara, Ibaraki (JP)

(72) Inventor: Takashi Ebihara, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 17/716,448

(22) Filed: Apr. 8, 2022

(65) Prior Publication Data

US 2022/0342354 A1 Oct. 27, 2022

(30) Foreign Application Priority Data

Apr. 21, 2021 (JP) ................................ 2021-072115

(51) Int. Cl.

| | |
|---|---|
| ***B65H 3/68*** | (2006.01) |
| ***B65H 3/12*** | (2006.01) |
| ***B65H 3/48*** | (2006.01) |
| ***B65H 3/54*** | (2006.01) |
| ***B65H 3/66*** | (2006.01) |
| ***G03G 15/00*** | (2006.01) |

(52) U.S. Cl.

CPC ............... *B65H 3/68* (2013.01); *B65H 3/128* (2013.01); *B65H 3/48* (2013.01); *B65H 3/54* (2013.01); *B65H 3/66* (2013.01); *G03G 15/6529* (2013.01); *B65H 2402/53* (2013.01); *B65H 2404/61* (2013.01); *B65H 2405/115* (2013.01)

(58) Field of Classification Search

CPC . B65H 1/04; B65H 3/128; B65H 3/48; B65H 3/54; B65H 3/66; B65H 3/68; B65H 2405/115; B65H 2405/141; B65H 2405/1412; B65H 2402/53; B65H 2404/61

See application file for complete search history.

(56) References Cited

U.S. PATENT DOCUMENTS

| | | | | |
|---|---|---|---|---|
| 5,044,622 A * | 9/1991 | Cattin | ..................... | B65H 3/06 271/167 |
| 2008/0088078 A1 | 4/2008 | Kushida | | |
| 2012/0205856 A1* | 8/2012 | Onodera | ................. | B65H 5/38 271/145 |

(Continued)

FOREIGN PATENT DOCUMENTS

| | | |
|---|---|---|
| JP | 56161239 A * | 12/1981 |
| JP | 2006-168977 | 6/2006 |

(Continued)

OTHER PUBLICATIONS

Extended European Search Report dated Sep. 19, 2022 issued in corresponding European Appln. No. 22167778.4.

*Primary Examiner* — Prasad V Gokhale
(74) *Attorney, Agent, or Firm* — Harness, Dickey & Pierce, P.L.C.

(57) ABSTRACT

A sheet conveying device includes a sheet stacker, an air blower, a guide, and a holder. The sheet stacker stacks sheets. The air blower blows air to the sheets on the sheet stacker. The guide is disposed facing an uppermost sheet of the sheets on the sheet stacker. The holder holds the guide and has a groove along which the guide is inserted. The groove has a plurality of direction switching portions at each of which the guide changes a direction of movement when the groove receives the guide.

6 Claims, 11 Drawing Sheets

(56) References Cited

U.S. PATENT DOCUMENTS

| | | | | |
|---|---|---|---|---|
| 2016/0107853 | A1* | 4/2016 | Hashimoto .............. | B65H 1/14 271/97 |
| 2020/0122491 | A1* | 4/2020 | Ogawa ................. | B41J 11/0045 |
| 2022/0073308 | A1 | 3/2022 | Ebihara | |
| 2022/0081241 | A1* | 3/2022 | Maeda ..................... | B65H 1/14 |

FOREIGN PATENT DOCUMENTS

| | | |
|---|---|---|
| JP | 2010-058917 | 3/2010 |
| JP | 2011-073807 | 4/2011 |
| JP | 2020-066532 | 4/2020 |

* cited by examiner

SHEET CONVEYING DEVICE AND IMAGE FORMING SYSTEM INCORPORATING THE SHEET CONVEYING DEVICE

CROSS-REFERENCE TO RELATED APPLICATION

This patent application is based on and claims priority pursuant to 35 U.S.C. § 119(a) to Japanese Patent Application No. 2021-072115, filed on Apr. 21, 2021, in the Japan Patent Office, the entire disclosure of which is hereby incorporated by reference herein.

BACKGROUND

Technical Field

Embodiments of the present disclosure relate to a sheet conveying device and an image forming system incorporating the sheet conveying device.

Background Art

As known in the art, various sheet conveying devices include a sheet stacker that contains sheets, an air blowing device that blows air to the sheets, and a guide disposed facing the uppermost sheet placed on top of the sheets in the sheet stacker.

For example, a typical sheet conveying device separates one sheet from another sheet by blowing air to a plurality of sheets by an air blowing device and conveys the separated one sheet. This sheet conveying device further includes a guide that guides the separated sheet by contacting the surface of the sheet over the given area from upstream to downstream in the conveyance direction of the sheet. The guide is inserted along a groove formed in the frame (holder) to be attached to the frame.

SUMMARY

Embodiments of the present disclosure described herein provide a novel sheet conveying device including a sheet stacker, an air blower, a guide, and a holder. The sheet stacker stacks sheets. The air blower blows air to the sheets on the sheet stacker. The guide is disposed facing an uppermost sheet of the sheets on the sheet stacker. The holder holds the guide and has a groove along which the guide is inserted. The groove has a plurality of direction switching portions at each of which the guide changes a direction of movement when the groove receives the guide.

Further, embodiments of the present disclosure described herein provide an image forming system including the above-described sheet conveying device and an image forming apparatus that forms an image on the sheet. The sheet conveying device and the image forming apparatus are integrated as a single unit or provided separately.

BRIEF DESCRIPTION OF THE SEVERAL VIEWS OF THE DRAWINGS

Exemplary embodiments of this disclosure will be described in detail based on the following figures, wherein.

Figure 1:
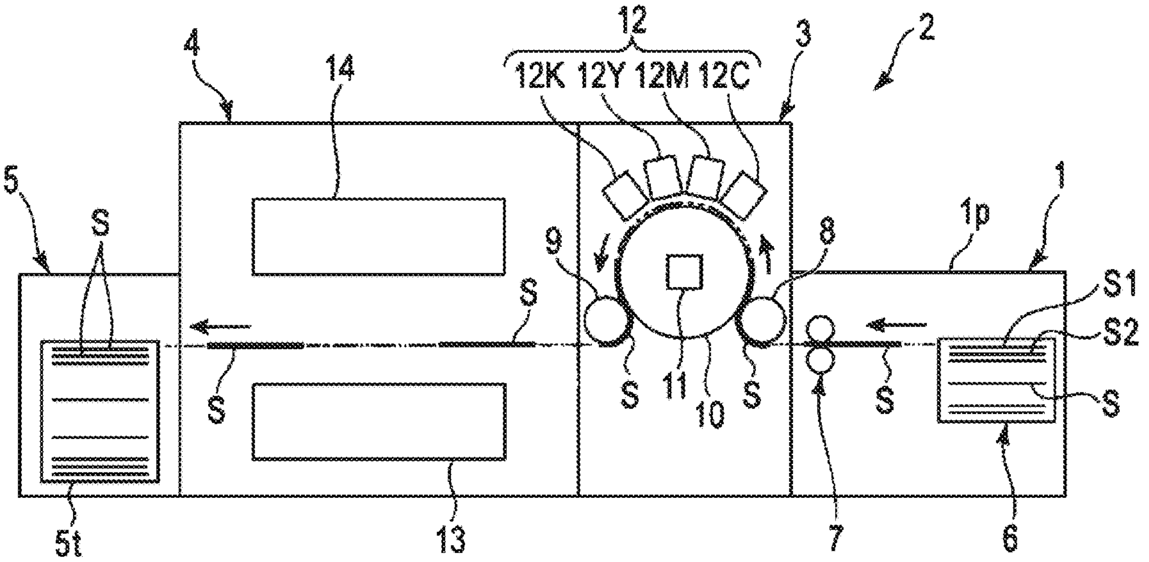
FIG. 1 is a schematic diagram illustrating an overall configuration of an image forming system including a sheet conveying device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, descriptions are given of a sheet conveying device according to an embodiment of the present disclosure, and an image forming system according to an embodiment of the present disclosure, including the sheet conveying device. Note that identical parts or equivalents are given identical reference numerals and redundant descriptions are summarized or omitted accordingly.

Embodiments of the present disclosure are described below with reference to the attached drawings.

FIG. 1 is a diagram illustrating an overall configuration of an image forming system 2 including a sheet conveying device 1, according to an embodiment of the present embodiment.

The image forming system 2 includes the sheet conveying device 1, an image forming apparatus 3, a drying device 4, and a sheet ejecting device 5, which are mutually connected. After a sheet S is fed from the sheet conveying device 1, an image is formed on the sheet S by the image forming apparatus 3. Then, the sheet S is dried by the drying device 4 to be stacked on a sheet ejection tray 5*t* of the sheet ejecting device 5.

The image forming system 2 may have a configuration of a known inkjet type image forming system. Further, the term "image" indicates not only an image (including a color image and a monochrome image) having meanings such as texts and figures on a recording medium but also an image having no meaning such as patterns on a recording medium. Furthermore, the term "sheet" (for example, the sheet S) has no limitation in the material, thickness, shape, size, weight, and the like. For example, the sheet is not limited to indicate a paper material but also includes a recording medium such as thread, fiber, cloth, leather, metal, synthetic resin, plastic, glass, wood, ceramics, or the like. The inkjet image forming system may be replaced with an electrophotographic image forming system in which an image is formed with toner.

The sheet conveying device 1 includes a sheet feeder 6 and a registration roller pair 7. The sheet feeder 6 and the registration roller pair 7 are disposed in an interior of a housing 1*p* of the sheet conveying device 1. A door is openably and closably attached to the housing 1*p*. On the other hand, by opening the door, the sheet feeder 6 is pulled out from the housing 1*p* of the sheet conveying device 1.

A stack of sheets S including the sheets S is disposed in the sheet feeder 6. The sheet feeder 6 blows air to the stack of sheets S to separate a sheet S1 that functions as a conveyance target object (for example, an uppermost sheet of the stack of sheets S) one by one from a subsequent sheet S2 of the stack of sheets S, so that the sheet S1 is fed out from the sheet feeder 6. The registration roller pair 7 conveys the sheet S (e.g., the uppermost sheet of the stack of sheets S) fed from the sheet feeder 6 to the image forming apparatus 3. Hereinafter, the sheet S1 is also referred to as the "uppermost sheet S1". A detailed description of the sheet feeder 6 is described below.

The image forming apparatus 3 includes a receiving cylinder 8, a transfer cylinder 9, a sheet carrying drum 10, an air suction unit 11, and an ink discharge unit 12. Sheet grippers are provided on a surface of the receiving cylinder 8, a surface of the transfer cylinder 9, and an outer circumferential surface of the sheet carrying drum 10. Each of the sheet grippers grips the leading end of the sheet S (in other words, a downstream end of the sheet S in a sheet conveyance direction). The air suction unit 11 is disposed within an inner loop of the sheet carrying drum 10. A plurality of dispersed suction holes is formed on the surface of the sheet carrying drum 10. The air suction unit 11 sucks air to generate a negative pressure, so that a suction airflow directed to the interior of the sheet carrying drum 10 is generated in each of the plurality of dispersed suction holes.

The ink discharge unit 12 is disposed facing (opposing) the surface of the sheet carrying drum 10. The ink discharge unit 12 is configured to discharge inks of four colors of cyan (C), magenta (M), yellow (Y), and black (K). The ink discharge unit 12 includes ink discharge heads 12K, 12Y, 12M, and 12C for each of the four color inks. The ink discharge heads 12K, 12Y, 12M, and 12C are separate units and controlled to discharge the respective inks of four colors toward the surface of the sheet carrying drum 10.

According to this configuration, after the sheet S has been fed out from the sheet conveying device 1 to the sheet carrying drum 10, while the sheet gripper of the receiving cylinder 8 grips the leading end of the sheet S, the sheet S is conveyed to the sheet carrying drum 10 as the receiving cylinder 8 rotates. After the sheet S has been conveyed to the sheet carrying drum 10, the sheet gripper of the sheet carrying drum 10 grips the leading end of the sheet S. At this time, the suction airflow described above is generated on the circumferential surface of the sheet carrying drum 10 (specifically, on the plurality of suction holes in the circumferential surface of the sheet carrying drum 10). According to this configuration, while being attracted by suction airflow on the plurality of suction holes of the circumferential surface of the sheet carrying drum 10, the sheet S is conveyed as the sheet carrying drum 10 rotates (in other words, as the circumferential surface of the sheet carrying drum 10 moves).

While the sheet S is conveyed along the plurality of suction holes of the surface of the sheet carrying drum 10, the ink discharge heads 12K, 12Y, 12M, and 12C are controlled. Respective inks are discharged from the ink discharge heads 12K, 12Y, 12M, and 12C toward the circumferential surface of the sheet S. According to this ink discharge, an image corresponding to image information set in advance is formed on the circumferential surface of the sheet S. Thereafter, the leading end of the sheet S reaches the transfer cylinder 9. At this time, the transfer cylinder 9 is driven at a given timing set in advance. Thus, the sheet S is conveyed to the drying device 4 along with movement of the surface of the transfer cylinder 9 while the leading end of the sheet S is gripped by the transfer cylinder 9.

The drying device 4 includes a conveyance unit 13 and a drying unit 14. According to this configuration, the sheet S conveyed to the drying device 4 is dried by the drying unit 14 while being conveyed by the conveyance unit 13. After the drying operation is performed, the sheet S is conveyed to the sheet ejecting device 5. During this sheet conveyance, curling (deformation due to curvature) of the sheet S is prevented. The sheets S conveyed from the drying device 4 are sequentially collected and stored in the sheet ejection tray 5*t*.

Figure 2:
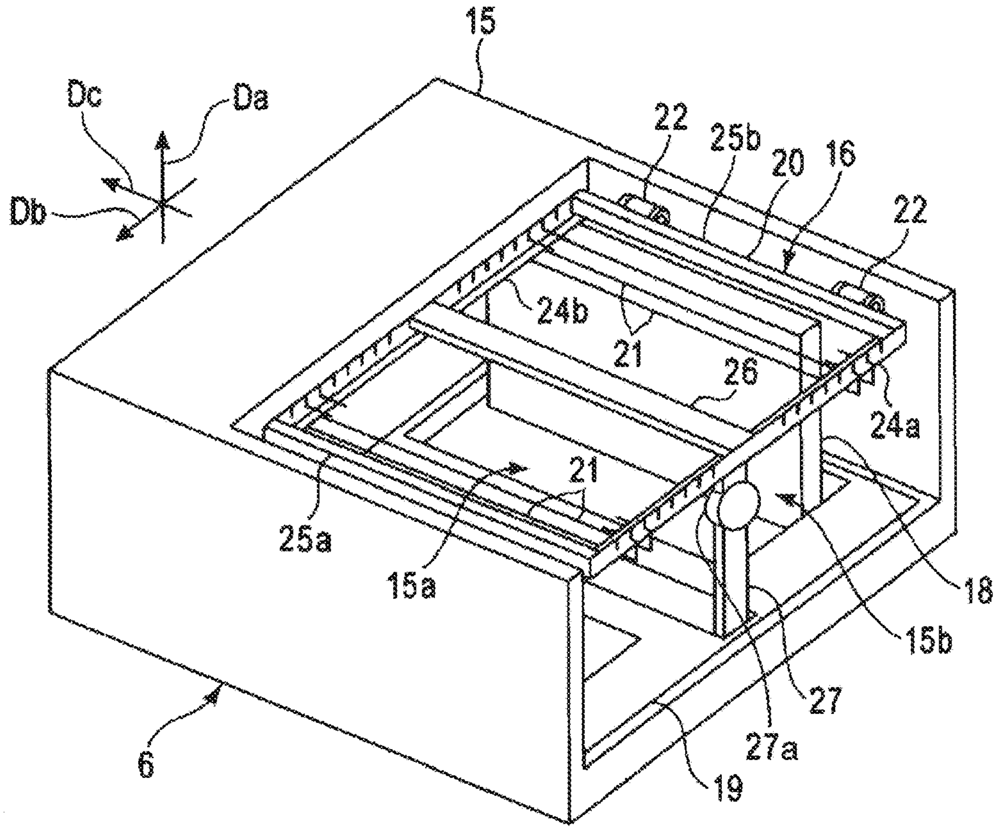
FIG. 2 is a perspective view of a schematic configuration of a sheet feeder included in the sheet conveying device of FIG. 1.

FIG. 2 is a perspective view illustrating the configuration of the sheet feeder 6 provided to the image forming system 2.

In FIG. 2, a vertical direction Da, a width direction Db, and a sheet conveyance direction Dc of the sheet feeder 6 are defined. These directions have the relation in positions that any two directions are perpendicular to each other. As illustrated in FIG. 2, the sheet feeder 6 includes a sheet stacker 15 as a sheet stacker, a guide mechanism 16, and a sheet feeding mechanism 17 (see FIG. 6).

The sheet stacker 15 includes a sheet replenishment opening 15*a* and a sheet containing portion 15*b*. The sheet replenishment opening 15*a* is open at an upper side of the sheet stacker 15 when viewed from the vertical direction Da and an upstream side (trailing end) of the sheet stacker 15 when viewed from the sheet conveyance direction Dc, penetrating the top side and the upstream side (trailing end) mutually in a rectangular shape. The sheet containing portion 15*b* receives the plurality of sheets S from the sheet replenishment opening 15*a*. In other words, the plurality of sheets S are inserted into the sheet stacker 15 through the sheet replenishment opening 15*a*. A pair of side walls 18 and a sheet feed tray 19 are provided in the sheet containing portion 15*b*.

The guide mechanism 16 is rotatably disposed with respect to the sheet stacker 15.

When the sheet S is conveyed, the guide mechanism 16 prevents the rise of the uppermost sheet S1 (see FIG. 1) that is a conveyance target object of the plurality of sheets S contained in the sheet containing portion 15*b* and guides the uppermost sheet S1 (conveyance target object) in the sheet conveyance direction Dc. The above-described sheet feed tray 19 is configured to move upward and downward in the vertical direction Da. Among the plurality of sheets S contained in the sheet containing portion 15*b*, the uppermost sheet S1 of the stack of sheets S is constantly positioned to a constant position that is set in advance (for example, a sheet conveyance start position).

The guide mechanism 16 includes a frame 20 and guides 21. The frame 20 functions as a holder. The frame 20 has a hollowed rectangular shape and is coupled to the sheet stacker 15 of the sheet feeder 6 via hinge mechanisms 22 (to be more specific, two hinge mechanisms 22). The frame 20 is disposed so as to cover the upper side of the sheet replenishment opening 15*a* (sheet containing portion 15*b*) described above. The two hinge mechanisms 22 are interposed between one side of the frame 20 (second connecting portion 25*b* described below) and the sheet stacker 15.

Figure 3:
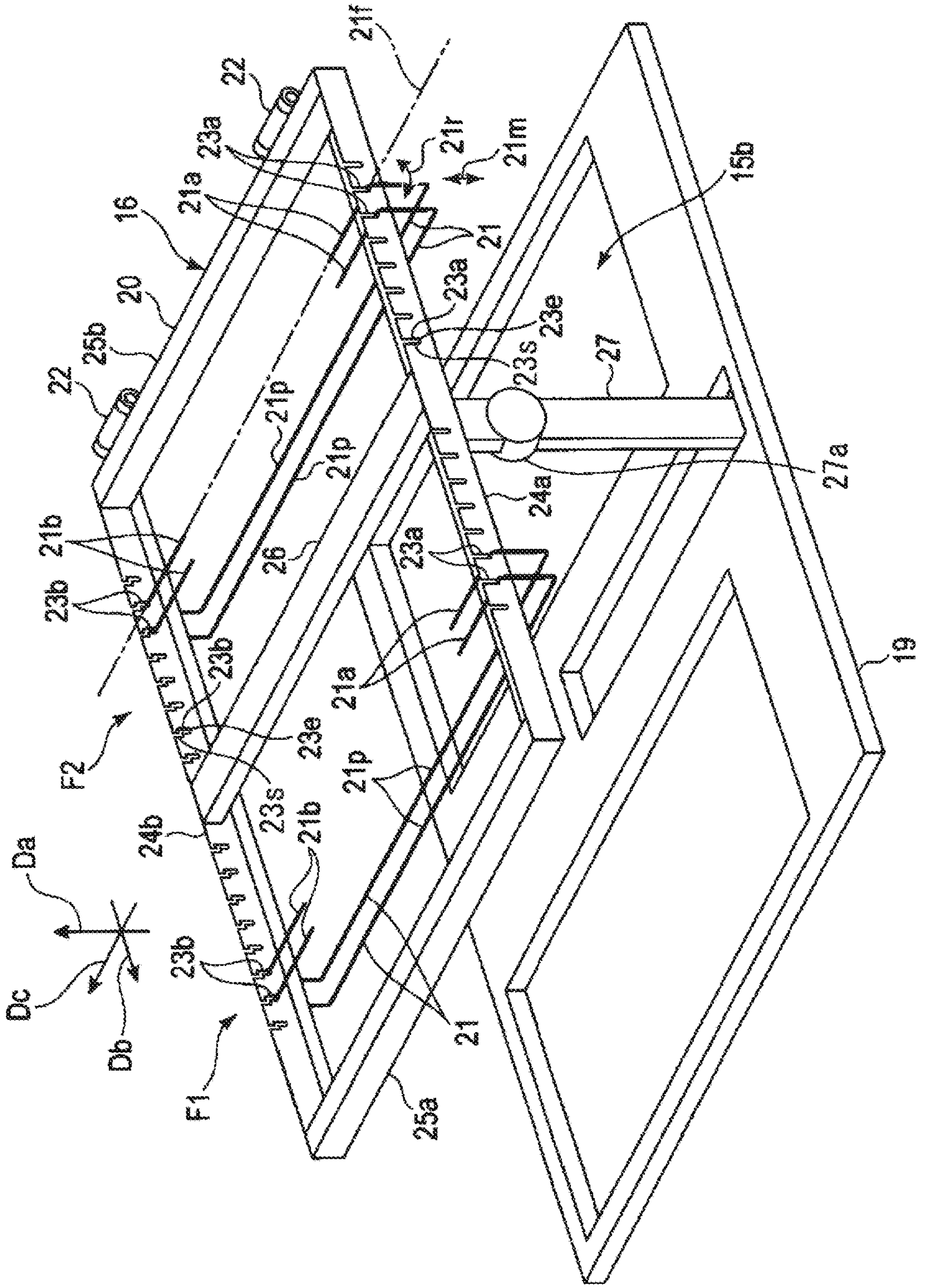
FIG. 3 is an enlarged perspective view of a main part of a guide mechanism included in the sheet feeder.

FIG. 3 is a perspective enlarged view illustrating the main part of the guide mechanism 16 including, for example, the frame 20, the guides 21, first receiving portions 23*a*, and second receiving portions 23*b*.

As illustrated in FIG. 3, the frame 20 includes two supports (i.e., a first support 24*a* and a second support 24*b*), two connecting portions (i.e., a first connecting portion 25*a* and the second connecting portion 25*b*), and a reinforcement member 26.

The first support 24*a* is disposed on the upstream side in the sheet conveyance direction Dc. The second support 24*b* is disposed on the downstream side in the sheet conveyance direction Dc. Specifically, the first support 24*a* is disposed upstream from the second support 24*b* in the sheet conveyance direction Dc. In other words, the second support 24*b* is disposed downstream from the first support 24*a* in the sheet conveyance direction Dc. The first support 24*a* and the second support 24*b* are disposed extending in the width direction Db and facing in parallel with each other when viewed from the sheet conveyance direction Dc. The first support 24*a* and the second support 24*b* have both ends (in other words, one end and an opposite end) and have shapes identical to each other with the same dimension (lengths).

The two connecting portions, which are the first connecting portion 25*a* and the second connecting portion 25*b*, are disposed between the first support 24*a* and the second support 24*b*. In this case, the first connecting portion 25*a* is mutually connected to one end of the first support 24*a* and one end of the second support 24*b*. The second connecting portion 25*b* is mutually connected to the opposite end of the first support 24*a* and the opposite end of the second support 24*b*. The first connecting portion 25*a* and the second connecting portion 25*b* are disposed extending in the sheet conveyance direction Dc and facing in parallel with each other when viewed from the width direction Db. The first connecting portion 25*a* and the second connecting portion 25*b* are mutually set to have the same dimensions (lengths) and the same shapes.

The reinforcement member 26 is disposed between the first connecting portion 25*a* and the second connecting portion 25*b*. In other words, the reinforcement member 26 is disposed at a position where the first support 24*a* and the second support 24*b* are divided into two equal parts in the width direction Db and extend along the sheet conveyance direction Dc.

An end fence 27 is disposed on the reinforcement member 26 of the frame 20. One end of the end fence 27 is supported by the reinforcement member 26 via a rotary shaft 27*a* and the opposite end of the end fence 27 extends downward along the vertical direction Da. The end fence 27 is configured to reciprocate along the reinforcement member 26. The end fence 27 is moved while the plurality of sheets S is contained in the sheet containing portion 15*b*. Due to such a configuration, the trailing end of the sheet S (upstream side end in the sheet conveyance direction Dc) is aligned by the end fence 27.

Further, the frame 20 includes a plurality of receiving portions (i.e., first receiving portions 23*a* and second receiving portions 23*b*). Each of the first receiving portions 23*a* and the second receiving portions 23*b* functions as a plurality of receiving portions and supports each guide 21 to be detachably attachable to the frame 20. Each of the first receiving portions 23*a* has a groove into which one longitudinal end of a guide 21 is inserted. The first receiving portions 23*a* are disposed along the first support 24*a*. Each of the second receiving portions 23*b* has a groove into which the opposite longitudinal end of the guide 21 is inserted. The second receiving portions 23*b* are disposed along the second support 24*b*. Both receiving portions, i.e., the first receiving portions 23*a* and the second receiving portions 23*b*, are disposed along the width direction Db that intersects the sheet conveyance direction Dc. In FIG. 3, as an example, on both sides (i.e., a first side F1 and a second side F2) of the reinforcement member 26, the first receiving portions 23*a* and the second receiving portions 23*b* are set by the equal number and arranged at equal intervals to each other. In other words, the number of the first receiving portions 23*a* is identical to the number of the second receiving portions 23*b*, the first receiving portions 23*a* are disposed at equal intervals, and the second receiving portions 23*b* are disposed at equal intervals.

The first receiving portions 23*a* and the second receiving portions 23*b* are aligned along the sheet conveyance direction Dc and disposed facing each other. Each guide 21 includes a first hook 21*a* and a second hook 21*b*, for example. Details of the first hook 21*a* and the second hook 21*b* are described below. The first hook 21*a* and the second hook 21*b* of the guide 21 are inserted into and placed on the first receiving portion 23*a* and second receiving portion 23*b* aligned each other along the sheet conveyance direction Dc. By so doing, the guides 21 are attached to the first receiving portions 23*a* and the second receiving portions 23*b*. As a result, the guides 21 are disposed along the sheet conveyance direction Dc.

Figure 4:
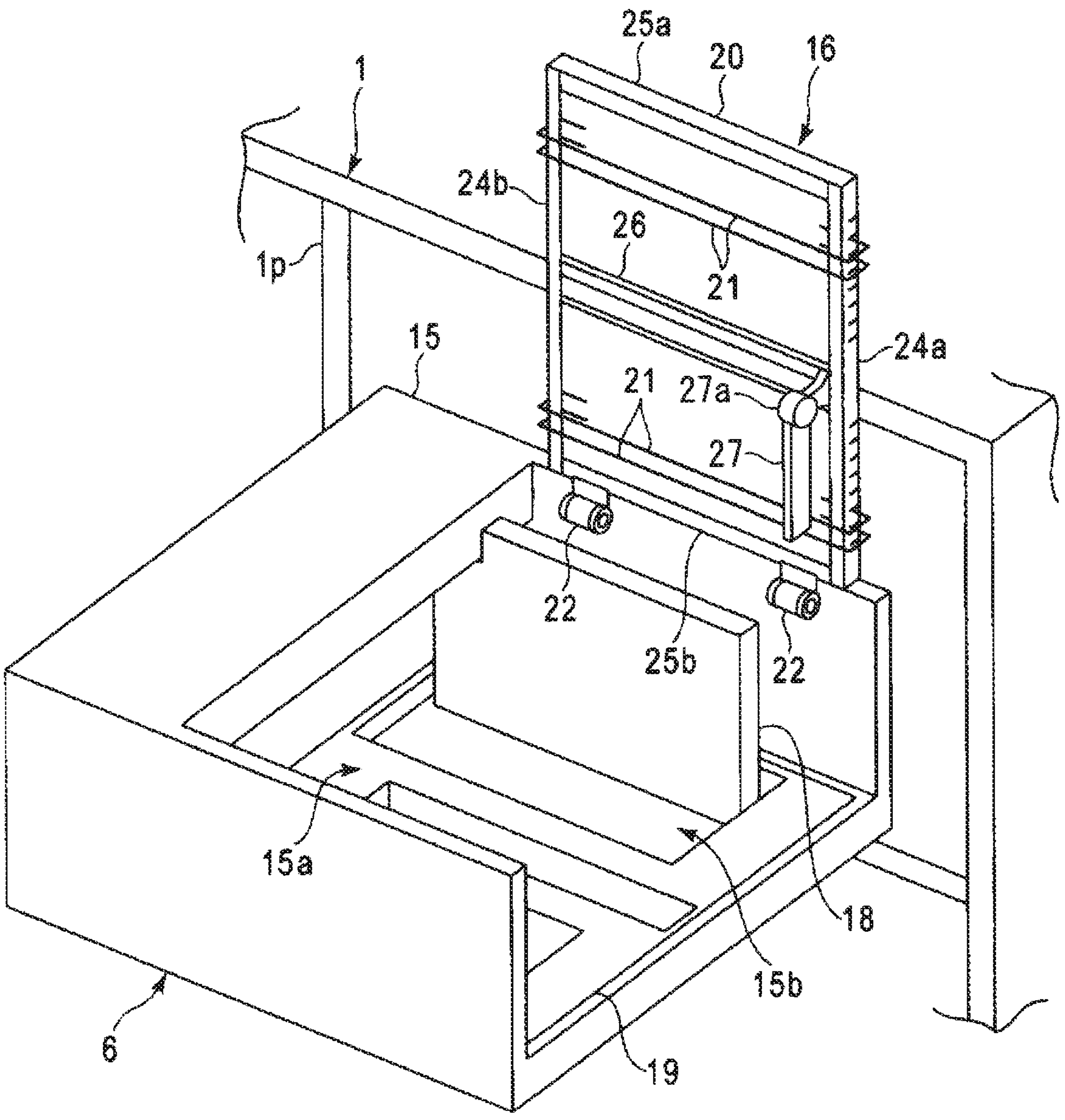
FIG. 4 is a perspective view of the sheet conveying device in a state in which the sheet feeder is detached from the housing of the sheet conveying device.

FIG. 4 is a perspective view of the sheet conveying device 1 in which the sheet feeder 6 with the guides 21 is pulled out (detached) from the housing 1*p* of the sheet conveying device 1.

As described above, the sheet feeder 6 is included in the housing 1*p* of the sheet conveying device 1, together with the frame 20 supporting the guides 21. The operator opens the housing 1*p* of the sheet conveying device 1 to pull out (detach) the sheet feeder 6 together with the frame 20, from the housing 1*p* to the outside of the sheet conveying device 1.

When setting a plurality of sheets S in the sheet containing portion 15*b*, the operator firstly pulls out (detach) the sheet feeder 6 to the outside of the housing p1 of the sheet conveying device 1, and then rotates the frame 20 together with the guides 21 by the hinge mechanisms 22 to open the sheet replenishment opening 15*a* (sheet containing portion 15*b*). Then, the operator supplies the plurality of sheets S into the sheet containing portion 15*b* through the sheet replenishment opening 15*a*. As a result, the plurality of sheets S supplied to the sheet containing portion 15*b* are stacked and contained in the sheet feed tray 19 between the pair of side walls 18.

At this time, the torque of each hinge mechanism 22 is applied in the downward direction alone along with the aid of gravity of the frame 20. For this reason, when the sheet S is set on the sheet feed tray 19 with the sheet replenishment opening 15*a* (sheet containing portion 15*b*) open, the frame 20 does not close even if the operator releases the hand from the frame 20. According to this configuration, the setting operation is performed easily.

Then, the frame 20 is rotated by the hinge mechanisms 22 to close the sheet replenishment opening 15*a* (sheet containing portion 15*b*). Thereafter, the operator puts the sheet feeder 6, together with the frame 20 supporting the guides 21, in the housing 1*p* of the sheet conveying device 1, and then close the cover of the housing 1*p*. Accordingly, the sheet feeder 6 is placed in the housing 1*p* of the sheet conveying device 1 again.

As described above, the frame 20 of the present embodiment is rotated by the hinge mechanisms 22 to close the sheet replenishment opening 15*a* (sheet containing portion 15*b*), so that the guides 21 are disposed at the facing position facing the uppermost sheet S1 of the plurality of sheets contained in the sheet containing portion 15*b*. Further, rotation of the frame 20 by the hinge mechanisms 22 to open the sheet replenishment opening 15*a* (sheet containing portion 15*b*) allows the guides 21 to move from the facing position to a retreated position.

In the present embodiment, the end fence 27 is disposed on the reinforcement member 26 of the frame 20. Due to such a configuration, both a process to retreat the end fence 27 from the sheet replenishment opening 15*a* (sheet containing portion 15*b*) and another process to open the sheet replenishment opening 15*a* (sheet containing portion 15*b*) are performed simultaneously with a single rotation of the frame 20.

Each of the first receiving portions 23*a* has a groove vertically recessed from the upper end to the lower end of a part of the first support 24*a*, when viewed form the vertical direction Da. Similarly, each of the second receiving portions 23*b* has a groove vertically recessed from the upper end to the lower end of a part of the second support 24*b*, when viewed from the vertical direction Da. Each of the receiving portions, i.e., the first receiving portions 23*a* and the second receiving portions 23*b*, has the upper end that is open and the lower end that is closed, when viewed from the vertical direction Da.

According to this configuration, the first hook 21*a* and the second hook 21*b* of each guide 21 are inserted from the upper end that is open, to the first receiving portion (groove) 23*a* and the second receiving portion (groove) 23*b*. Then, the first hook 21*a* and the second hook 21*b* of each guide 21 are inserted into the first receiving portion (groove) 23*a* and the second receiving portion (groove) 23*b* until the first hook 21*a* and the second hook 21*b* of each guide 21 come into contact with the lower end of the first receiving portion (groove) 23*a* and the second receiving portion (groove) 23*b*, so that the first hook 21*a* and the second hook 21*b* of each guide 21 are placed on the first receiving portion (groove) 23*a* and the second receiving portion (groove) 23*b*. As a result, the guides 21 are hold by the frame 20 via the first receiving portions 23*a* and the second receiving portions 23*b*.

Each of the guides 21 has a sheet contact portion 21*p* and the hooks (i.e., the first hook 21*a* and the second hook 21*b*). In the example illustrated in FIG. 3, the sheet contact portion 21*p* has a long straight line shape extending straight. The sheet contact portion 21*p* is extended with a columnar shape in a circular cross section. The diameter of the sheet contact portion 21*p* is set to be equal (constant) over the entire length of the sheet contact portion 21*p*. The hooks (i.e., the first hook 21*a* and the second hook 21*b*) are provided at both ends of the sheet contact portion 21*p*. In other words, the first hook 21*a* is provided at one end of the sheet contact portion 21*p* and the second hook 21*b* is provided at the opposite end of the sheet contact portion 21*p*.

The entire length of each guide 21 (that is, the entire length of the sheet contact portion 21*p*) is set in correspondence with the entire length in the sheet conveyance direction Dc of the sheet S contained in the sheet containing portion 15*b*. Specifically, the entire length of the sheet contact portion 21*p* is set to contact throughout the entire length of the surface of the uppermost sheet S1, which functions as a conveyance target object, from an upstream area are (i.e., the trailing end of the uppermost sheet S1) to a downstream area (i.e., the leading end of the uppermost sheet S1) in the sheet conveyance direction Dc. Here, the term "upstream area" is a concept including an area between the trailing end of the uppermost sheet S1 in the sheet conveyance direction Dc and the center of the uppermost sheet S1, and the term "downstream area" is a concept including an area between the leading end of the uppermost sheet S1 and the center of the uppermost sheet S1 in the sheet conveyance direction Dc. Note that, instead of the configuration according to the present embodiment, each guide 21 may be set to contact the uppermost sheet S1, functioning as a conveyance target object of the plurality of sheets S contained in the sheet containing portion 15*b*, from the upstream area to the center of the uppermost sheet S1 in the sheet conveyance direction Dc.

The first hook 21*a* is integrated with the one end of the sheet contact portion 21*p*. The first hook 21*a* is bent toward the opposite end of the sheet contact portion 21*p* (i.e., the second hook 21*b*). On the other hand, the second hook 21*b* is integrated with the opposite end of the sheet contact portion 21*p*. The second hook 21*b* is bent toward the opposite end of the sheet contact portion 21*p* (i.e., the first hook 21*a*). The first hook 21*a* and the second hook 21*b* of each guide 21 are set to have the same shape and diameter as the sheet contact portion 21*p*.

In the present embodiment, the first hook 21*a* is inserted into and placed on the first receiving portion 23*a* of the first support 24*a* and the second hook 21*b* is inserted into and placed on the second receiving portion 23*b* of the second support 24*b*. As a result, each sheet contact portion 21*p* is supported by the first support 24*a* and the second support 24*b* via the first hook 21*a* and the second hook 21*b*, respectively, and each guide 21 is supported by the frame 20. That is, the guide 21 is suspended by the first receiving portion 23*a* and the second receiving portion 23*b*.

In the above-described state, the guide 21 maintains the posture in which the guide 21 hangs down with the own weight along the vertical direction Da (also referred to as the direction of gravitational force). In other words, the guide 21 maintains the posture in which the sheet contact portion 21*p* is positioned immediately below the first hook 21*a* and the second hook 21*b*, when viewed from the direction of gravitational force. At this time, the guide 21 (specifically, the sheet contact portion 21*p*) is disposed parallel to the surface of the uppermost sheet S1 (conveyance target object) of the plurality of sheets S contained in the sheet containing portion 15*b* and is disposed parallel to the sheet conveyance direction Dc. As an example illustrated in FIG. 3, two guides 21 are supported at symmetrical positions of both sides (i.e., the first side F1 and the second side F2) of the reinforcement member 26, when viewed from the width direction Db. The guides 21 are maintained in respective postures in which the sheet contact portion 21*p* is positioned immediately below the first hook 21*a* and the second hook 21*b*, by the own weights of the guides 21. The respective guides 21 are changeable in positions (positional change) by rotational motion 21*r* and reciprocating motion 21*m* to reduce frictional resistance (load resistance) between the sheet contact portion 21*p* of the guide 21 and the sheet S. Such positional change (i.e., movement of each of the guides 21 by rotational motion 21*r* and reciprocating motion 21*m*) may occur according to a contact state between the guide 21 and the uppermost sheet S1 (conveyance target object) separated from the subsequent sheet S2, for example, when the uppermost sheet S1 is fed from the sheet feeder 6 (at sheet feeding).

The rotational motion 21*r* of the guide 21 is assumed, for example, to be a rotational motion rotating about a virtual axis 21*f* extending along the sheet conveyance direction Dc (for example, an axis extending both the first hook 21*a* and the second hook 21*b* in the sheet conveyance direction Dc). The reciprocating motion 21*m* of the guide 21 is assumed, for example, to be a reciprocating motion moving, at sheet feeding, along a direction in which the uppermost sheet S1 (conveyance target object object) separates from the subsequent sheet S2 in the sheet feeder 6 (in other words, along a thickness direction intersecting or perpendicular to the surface of the uppermost sheet S1). In this case, the reciprocating motion 21*m* of the guides 21 corresponds to a reciprocating motion in which the sheet contact portion 21*p* lifts or lowers, viewed from the vertical direction Da, when the first hook 21*a* and the second hook 21*b* rotate about the virtual axis 21*f* (line of axis).

To be more specific, the positional change of each of the guides 21 (movement of each of the guides 21 by the rotational motion 21*r* or the reciprocating motion 21*m*) described above is likely to occur depending on types (for example, the thickness and the weight) of the uppermost sheet S1 (conveyance target object). For example, if the uppermost sheet S1 functioning as a conveyance target object is a lightweight, thin sheet, the position of the guide 21 in contact with the uppermost sheet S1 does not change. In other words, since the pressing force from the lightweight, thin sheet S1 applies small pressing force to the guide 21, the guide 21 is maintained in the initial hanging posture without changing the position. By contrast, if the uppermost sheet S1 functioning as a conveyance target object is a heavyweight, thick sheet, the position of the guide 21 in contact with the uppermost sheet S1 changes. In other words, since the pressing force from the heavyweight, thick sheet S1 applies large pressing force to the guide 21, the guide 21 performs the rotational motion 21*r* about the virtual axis 21*f* or the reciprocating motion 21*m* along the thickness direction.

Figure 5:
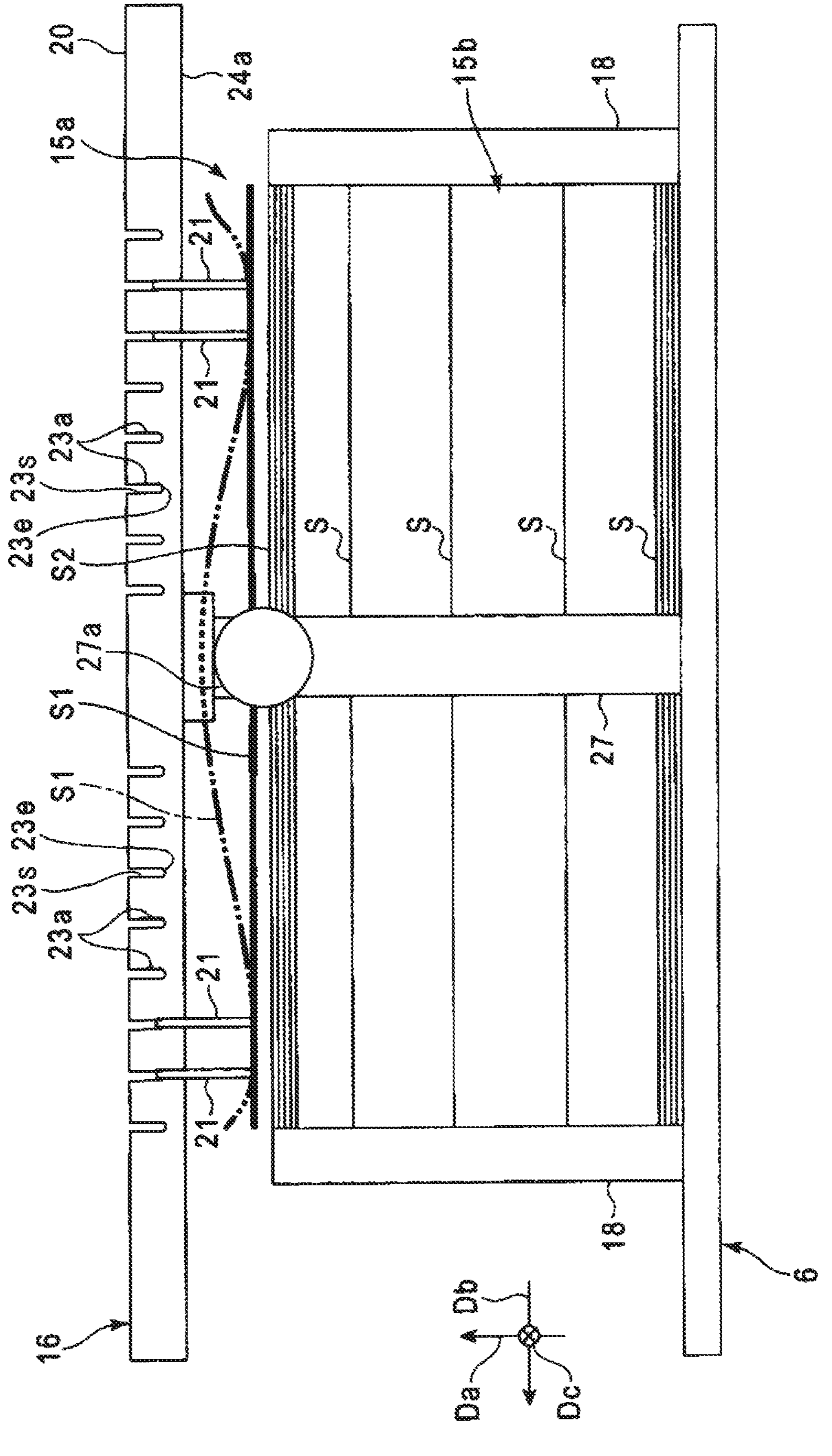
FIG. 5 is an end view of the sheet feeder included in the sheet conveying device, viewed from an end fence.

FIG. 5 is an end view of the sheet feeder 6 included in the sheet conveying device 1, when viewed from the end fence 27.

As illustrated in FIG. 5, the plurality of sheets S that is inserted in the sheet containing portion 156 of the sheet feeder 6 is stacked and contained between the pair of side walls 18 on the sheet feed tray 19. In this state, the sheet feeding mechanism 17 is operated. Details of the sheet feeding mechanism 17 are described below. As a result, the uppermost sheet S1 (conveyance target object) is fed out from the sheet feeder 6.

Figure 6:
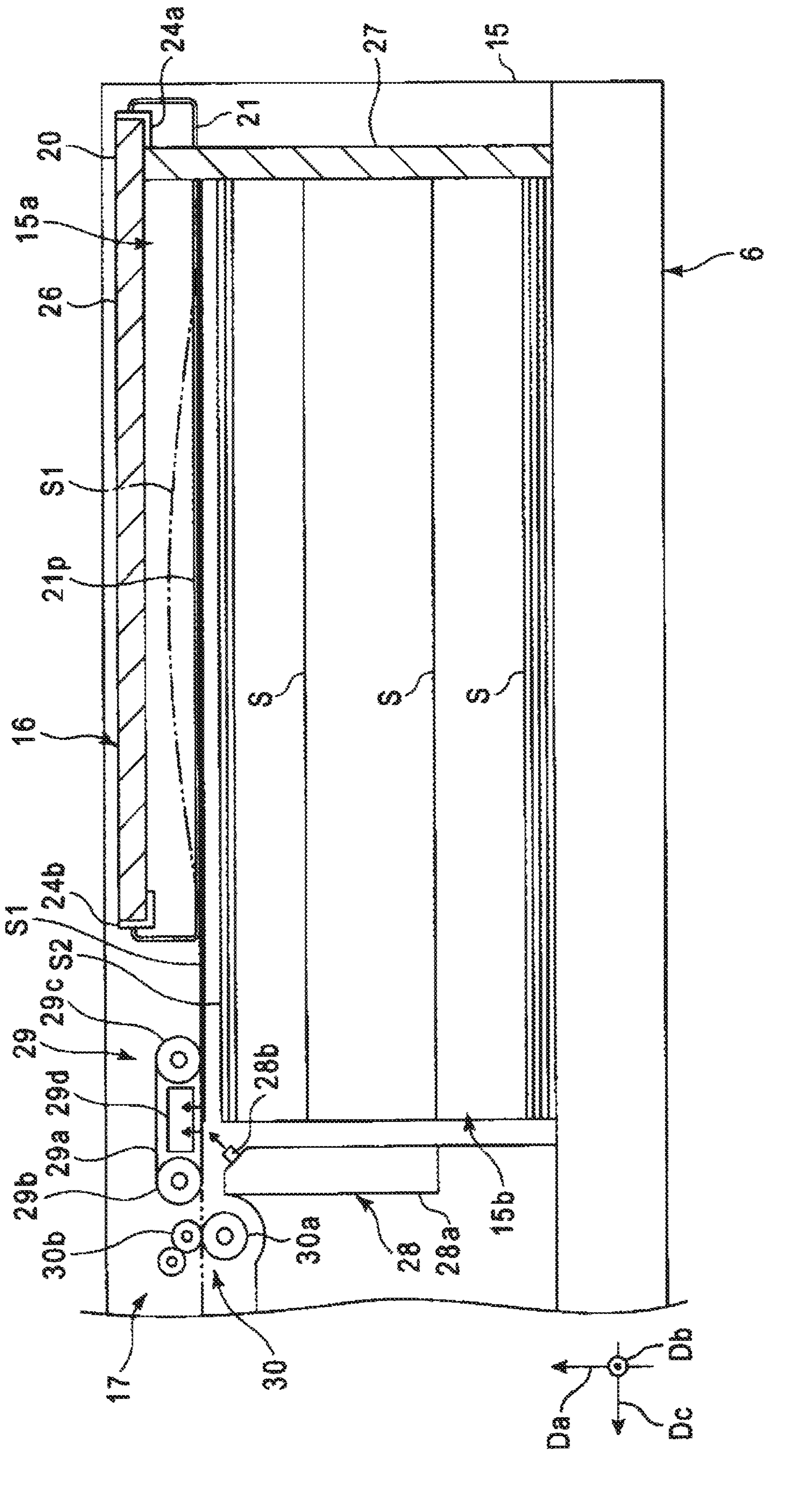
FIG. 6 is a side view of a configuration of a sheet feeding mechanism included in the sheet feeder.

FIG. 6 is a side view illustrating the sheet feeding mechanism 17 provided with the sheet feeder 6.

As illustrated in FIG. 6, the sheet feeding mechanism 17 is disposed adjacent to the sheet containing portion 156 and on the downstream side (leading end) of the sheet S in the sheet conveyance direction Dc. In this case, the sheet feeding mechanism 17 includes an air blowing device 28 (also referred to as an air blower), an air suction device 29, and a group of sheet feed rollers 30. Note that the configuration of the sheet feeding mechanism 17 illustrated in FIG. 6 is an example configuration, and another configuration may be applied to the sheet feeding mechanism 17.

The air blowing device 28 functioning as an air blower includes a housing 28*a* and a nozzle 28*b*. The housing 28*a* supplies compressed air to the nozzle 28*b*. The nozzle 28*b* blows air supplied from the housing 28*a*. In the example of FIG. 6, the nozzle 28*b* blows air toward the uppermost sheet S1 at the sheet conveyance start position (i.e., the uppermost sheet S1 placed on top of the plurality of sheets S contained in the sheet containing portion 15*b*) and the subsequent sheet S2 near the uppermost sheet S1 of the plurality of sheets S.

The air suction device 29 includes an attraction belt 29*a* in a form of an endless loop, a pair of rollers including, for example, a drive roller 29*b* and a driven roller 29*c*, and an air suction unit 29*d*. The attraction belt 29*a* is wound around the pair of rollers, that is, the drive roller 29*b* and the driven roller 29*c*. The attraction belt 29*a* has a plurality of suction holes that are scattered over the entire surface. The plurality of suction holes penetrate through the attraction belt 29*a* in the thickness direction. In this case, for example, as the drive roller 29*b* rotates, the attraction belt 29*a* is moved in the sheet conveyance direction. The air suction unit 29*d* is disposed inside the loop of the attraction belt 29*a* and between the pair of rollers, that is, the drive roller 29*b* and the driven roller 29*c*. The air suction unit 29*d* generates the negative pressure to the lower side of the attraction belt 29*a* (in other words, the area facing the uppermost sheet S1 of the plurality of sheets S contained in the sheet containing portion 15*b*), when viewed from the vertical direction Da. By generating the negative pressure to the lower side of the attraction belt 29*a*, suction airflow is generated from each suction hole toward the attraction belt 29*a*.

The group of sheet feed rollers 30 includes a pair of conveyance rollers, for example, including conveyance rollers 30*a* and 30*b*. The pair of conveyance rollers, i.e., the conveyance rollers 30*a* and 30*b* in contact with each other, rotates in opposite directions to each other. By so doing, the sheet S that has reached the pair of conveyance rollers including the conveyance rollers 30*a* and 30*b* is conveyed toward the registration roller pair 7 (see FIG. 1).

In the present embodiment, for example, while the attraction belt 29*a* is moving, the negative pressure is generated to the lower side of the attraction belt 29*a*. While the negative pressure is generated to the lower side of the attraction belt 29*a*, air is blown from the nozzle 28*b* to the uppermost sheet S1 at the sheet conveyance start position and the subsequent sheet S2 near the uppermost sheet S1 of the plurality of sheets S. By so doing, the uppermost sheet S1 of the plurality of sheets S contained in the sheet containing portion 15*b* (in other words, the uppermost sheet S1 (conveyance target object) is separated to rise from the subsequent sheet S2. Thus, the uppermost sheet S1 (conveyance target object) alone is attracted to the attraction belt 29*a*.

In this state, the attraction belt 29*a* is moved. With the movement of the attraction belt 29*a*, the uppermost sheet S1 (conveyance target object) is fed out toward the group of sheet feed rollers 30. Then, when the leading end of the uppermost sheet S1 (conveyance target object) reaches the pair of conveyance rollers (for example, the conveyance rollers 30*a* and 30*b*), the conveyance rollers 30*a* and 30*b* start rotating. As a result, the uppermost sheet S1 (conveyance target object) is conveyed to the image forming apparatus 3 via the registration roller pair 7 described above.

According to the present embodiment, the guide mechanism 16 includes the guides 21 that contact the surface of the uppermost sheet S1 (conveyance target object) over the area from the upstream area to the downstream area in the sheet conveyance direction Dc to guide the uppermost sheet S1. In this case, the uppermost sheet S1 (conveyance target object) is guided by the guides 21 while contacting over the given area from upstream to downstream of the uppermost sheet S1, when viewed from the sheet conveyance direction Dc. Due to such a configuration, the uppermost sheet S1 (conveyance target object) is prevented from rising as indicated by broken lines in FIGS. 5 and 6. In other words, this configuration prevents rise of the uppermost sheet S1 (conveyance target object) in the upstream area of the uppermost sheet S1 (i.e., the trailing end of the uppermost sheet S1) and in the downstream area that is downstream from the upstream area in the sheet conveyance direction Dc, simultaneously. As a result, jam or paper jam caused by conveyance failure of the uppermost sheet S1 is prevented before occurring.

It is preferable that the guides 21 guide the uppermost sheet S1 while contacting the surface of the uppermost sheet S1 over an area from at least the upstream area to the center of the uppermost sheet S1 in the sheet conveyance direction Dc. It is more preferable that the above-described given area is the downstream area of the uppermost sheet S1 (i.e., the leading end of the uppermost sheet S1) in the sheet conveyance direction Dc. It is much more preferable that the guides 21 are provided further upstream of the uppermost sheet S1 in the sheet conveyance direction Dc from the trailing end (end of the upstream side) of the uppermost sheet S1 in the sheet conveyance direction Dc.

Further, it is preferable that the guides 21 are parallel to the surface of the uppermost sheet S1 contained in the sheet containing portion 15*b* and parallel to the sheet conveyance direction Dc of the uppermost sheet S1. As a result, while maintaining the posture of the uppermost sheet S1 rising by air blown by the air blowing device 28, the uppermost sheet S1 is conveyed toward a downstream sheet conveyance passage in which the group of sheet feed rollers 30 is disposed, without causing skew or other failure.

The guide mechanism 16 according to the present embodiment has functions capable of changing the position to cause the guide 21 to change the position of the guide 21 with the rotational motion 21*r* and the reciprocating motion 21*m*. In this case, when each guide 21 performs the rotational motion 21*r*, the sheet contact portion 21*p* rotates about the virtual axis 21*f*. Further, when each guide 21 performs the reciprocating motion 21*m*, the sheet contact portion 21*p* moves vertically, when viewed from the vertical direction Da. By so doing, the uppermost sheet S1 (conveyance target object) is separated from the subsequent sheet S2 by an optimal distance, so that the uppermost sheet S1 is held at a position to be conveyed easily and is positioned parallel to the sheet conveyance direction Dc. As a result, the uppermost sheet S1 separated by air from the subsequent sheet S2 is significantly enhanced in the conveyance accuracy or conveyance stability.

Figure 7A:
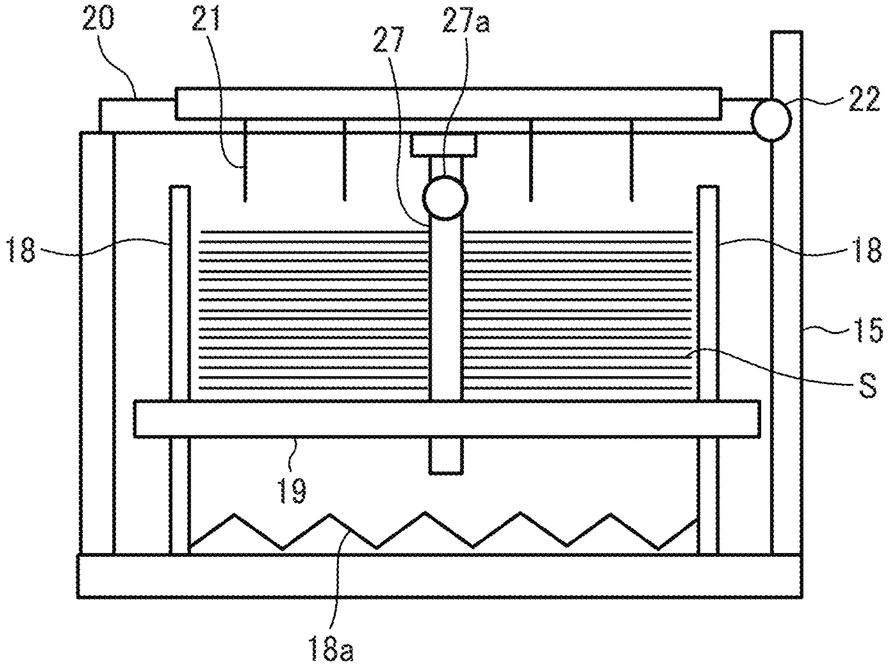
FIG. 7A is a schematic view of the sheet feeder containing sheets, when viewed from the end fence.

FIG. 7A is a schematic view of the sheet feeder 6 containing sheets, when viewed from the end fence 27.

Figure 7B:
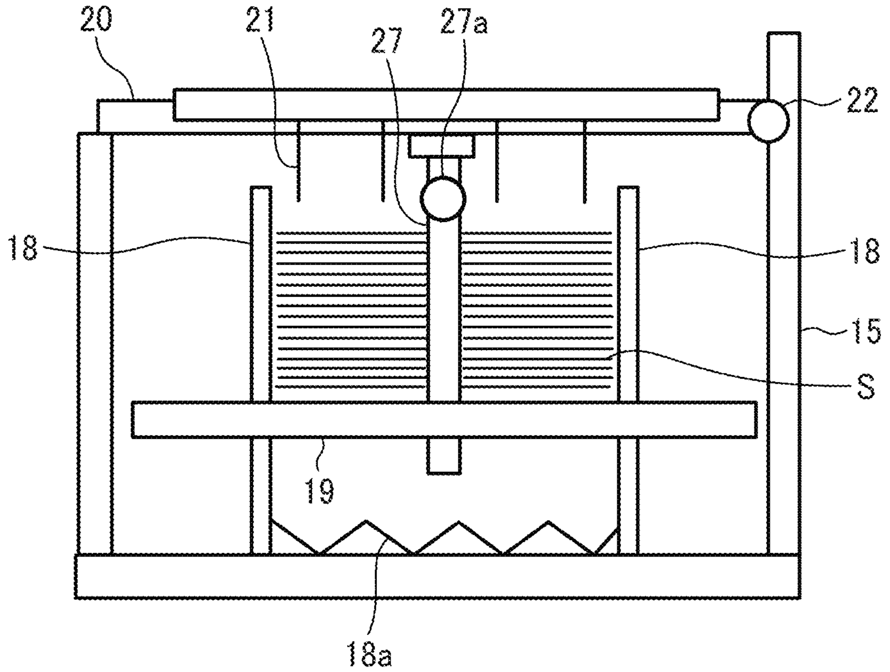
FIG. 7B is a schematic view of the sheet feeder containing sheets having a width different from the sheets in FIG. 7A, when viewed from the end fence.

FIG. 7B is a schematic view of the sheet feeder 6 accommodating sheets having a width different from the sheets in FIG. 7A, when viewed from the end fence 27.

In the frame 20 of the present embodiment, a plurality of guides 21 (four guides 21 in FIGS. 7A and 7B) are attached to the first receiving portions (grooves) 23*a* and the second receiving portions (grooves) 23*b* selected in accordance with the width of the sheet S. Further, the positions of the pair of side walls 18 are moved in accordance with the width of the sheets S to be contained in the sheet feeder 6. The pair of side walls 18 is configured such that a coupling drive unit 18*a* causes the respective side walls 18 to move in conjunction with each other.

For example, when a sheet S having a relatively long width is contained in the sheet feeder 6 as illustrated in FIG.

7A, the guides 21 are moved to the first receiving portion (groove) 23*a* and the second receiving portion (groove) 23*b* farther away from the center in the width direction of the sheet S, than the positions of the first receiving portion (groove) 23*a* and the second receiving portion (groove) 23*b* when a sheet S having a relatively short width is contained as illustrated in FIG. 7B. In this manner, the guide 21 is attached to the first receiving portion (groove) 23*a* and the second receiving portion (groove) 23*b* at the optimum positions in accordance with the width of the sheet S. Thus, even when a sheet S having any width is used, the posture of the uppermost sheet S1 lifted by air blown from the air blowing device 28 is maintained by the guide 21.

As described above, in the present embodiment, the operator performs an operation of changing the positions of the guides 21 with respect to the plurality of receiving portions (grooves), i.e., the first receiving portions (grooves) 23*a* and the second receiving portions (grooves) 23*b* formed in the frame 20. To facilitate this operation of changing the positions of the guides 21, the guides 21 may be attached by inserting into the first receiving portions 23*a* and the second receiving portions 23*b* to which the guides 21 are to be attached and may be detached by pulling off from the first receiving portions 23*a* and the second receiving portions 23*b* along the grooves.

However, such facilitation of changing the positions of the guides 21 was likely to cause the guides 21 to come off from the first receiving portions 23*a* and the second receiving portions 23*b* of the frame 20. Particularly, as illustrated in FIG. 4, when the frame 20 is rotated together with the guides 21 by the hinge mechanisms 22 to open the sheet replenishment opening 15*a* (sheet containing portion 15*b*), the guides 21 are likely to come off from the first receiving portions 23*a* and the second receiving portions 23*b* of the frame 20.

Figure 8:
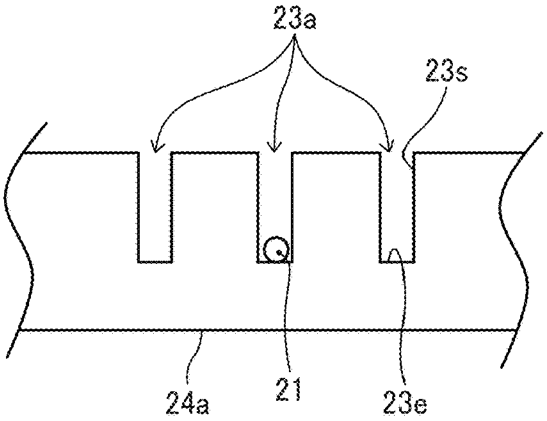
FIG. 8 is a diagram illustrating an example of the shape of the groove of a first receiving portion formed in a frame according to the present embodiment.

FIG. 8 is a diagram illustrating an example of the shape of a groove of the first receiving portions 23*a* in the frame 20 according to the present embodiment.

As illustrated in FIG. 8, of the receiving portions of the frame 20, each of the first receiving portions 23*a* functions as the first groove and is disposed upstream from a corresponding one of the second receiving portions 23*b* of the frame 20 in the sheet conveying direction Dc. The shape of the groove of each first receiving portion 23*a* is a shape extending linearly from the opening 23*s* that is the upper end of the groove to the lower end 23*e* of the groove. With such a shape, insertion and removal of the guide 21 with respect to the first receiving portion 23*a* are performed by simply moving the guide 21 straight along the shape of the groove. Thus, the guide 21 is easily handled and the operation of changing the position of the guide 21 is facilitated.

However, in insertion and removal of the guide 21 with respect to the first receiving portion 23*a* having such a shape of a groove, when external force is applied to move the guide 21 that is inserted into the first receiving portion 23*a* until the guide 21 contacts the lower end 23*e* of the first receiving portion 23*a*, toward the opening 23*s*, the guide 21 easily moves to the opening 23*s* and comes off to fall from the frame 20. Particularly, as described above, when the frame 20 is rotated by the hinge mechanisms 22 to leave the sheet replenishment opening 15*a* open, the direction of extension of the groove directs substantially horizontally. Due to such a configuration, the guides 21 are likely to slip in the groove to fall from the openings 23*s* of the groove, resulting in coming off from the first receiving portions 23*a* and the second receiving portions 23*b* of the frame 20.

Figure 9:
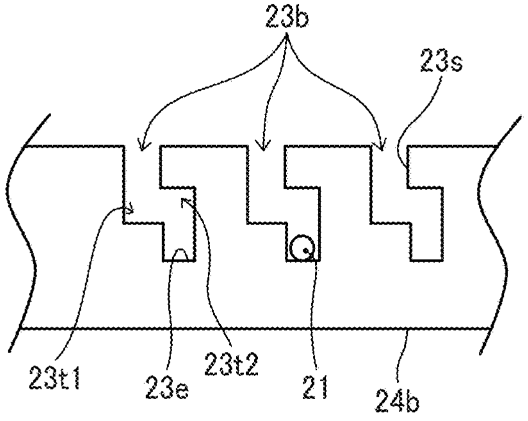
FIG. 9 is a diagram illustrating an example of the shape of the groove of a second receiving portion formed in the frame.

FIG. 9 is a diagram illustrating an example of the shape of the groove of the second receiving portion 23*b* formed in the frame 20 according to the present embodiment.

In the present embodiment, of the receiving portions of the frame 20, each of the second receiving portions 23*b* functions as a second groove. Each second receiving portion 23*b* has a plurality of direction switching portions. Each direction switching portion causes the guide 21 to change the direction of movement of the guide 21 when the guide 21 is inserted into the second receiving portion 23*b*.

When a single direction switching portion is provided with the groove of the second receiving portion 23*b*, the following exemplary convenience is likely to occur.

In consideration of easy insertion and removal of the guide 21 with respect to the groove of the second receiving portion 23*b*, it is preferable to satisfy a condition that the groove portion near the opening extending downward from the opening 23*s* of the groove has a shape extending linearly in a direction close to the vertical direction with the frame 20 closed. Further, considering the reciprocating motion 21*m* of the guide 21 when guiding the uppermost sheet S1, it is preferable to satisfy a condition that the groove portion near the lower end extending upward from the lower end 23*e* of the groove has a shape extending linearly in a direction close to the vertical direction with the frame 20 closed. When the groove shape has a single direction switching portion, one of these conditions is satisfied, in other words, not both of the conditions are satisfied. If the groove is to satisfy both conditions, the angle of the direction switching portion becomes too shallow, the overall shape of the groove becomes close to a straight line, and the guide 21 easily falls off from the frame 20.

On the other hand, when a plurality of direction switching portions are provided in the groove of the second receiving portion 23*b*, it is easy to satisfy both of the above-described conditions while preventing the guide 21 from falling off from the frame 20. For example, as illustrated in FIG. 9, when the groove of the second receiving portion 23*b* has a shape in which two bent portions 23*t*1 and 23*t*2 are provided as direction switching portions between the opening 23*s* and the lower end 23*e* of the groove, the two bent portions 23*t*1 and 23*t*2 may be bent at right angles (bent in opposite directions to each other). As a result, both the portion near the opening of the groove and the portion near the lower end of the groove are be formed into a shape extending linearly in a direction close to the vertical direction the frame 20 closed.

In addition, since the two bent portions 23*t*1 and 23*t*2 are bent at right angles, the guide 21 is less likely to fall off from the frame 20.

Specifically, when the guide 21 the guide 21 that is inserted into the second receiving portion 23*b* until the guide 21 contacts the lower end 23*e* of the second receiving portion 23*b*, toward the opening 23*s*, along the groove portion near the lower end 23*e*, the wall surface of the bent portion 23*t*2 contacts the guide 21 at a right angle. Due to such a configuration, the guide 21 does not slide on the wall surface of the bent portion 23*t*2 to move toward the opening 23*s* of the second receiving portion 23*b* due to the force of the guide 21 that comes along the groove portion near the lower end 23*e* of the groove of the second receiving portion 23*b*.

Even if the guide 21 in contact with the wall surface of the bent portion 23*t*2 moves toward the bent portion 23*t*1, the wall surface of the bent portion 23*t*1 contact the guide 21 at a right angle. Due to such a configuration, the guide 21 does not slide on the wall surface of the bent portion 23*t*1 to move toward the opening 23_s_ of the second receiving portion 23_b_ due to the force of the guide 21 that comes toward the bent portion 23_t_1.

Figure 10:
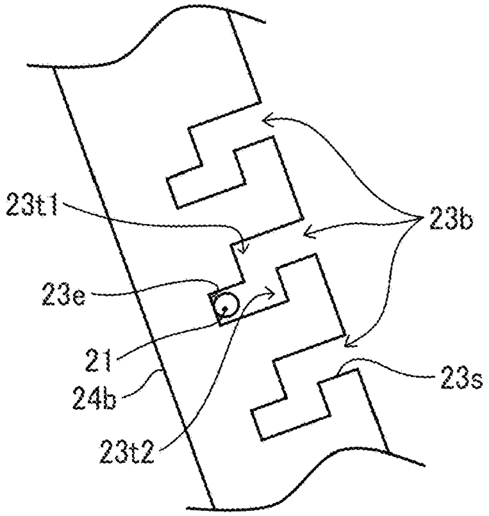
FIG. 10 is a diagram illustrating the shape of the groove of the second receiving portion in a state in which the frame is rotated by hinge mechanisms to open a sheet replenishment opening.

Moreover, FIG. 10 is a diagram illustrating the shape of the groove of the second receiving portion 23_b_ in a state in which the frame 20 is rotated by hinge mechanisms 22 to open the sheet replenishment opening 15_a_.

In the present embodiment, of the bent portions 23_t_1 and 23_t_2, the bent portion 23_t_2 on the lower end 23_e_ of the second receiving portion 23_b_ is bent upward with respect to the direction of extension of the portion near the lower end 23_e_ of the groove when the frame 20 is rotated by the hinge mechanisms 22 to open the sheet replenishment opening 15_a_ (sheet containing portion 15_b_) as illustrated in FIG. 10. According to this configuration, the guide 21 in contact with the wall surface of the bent portion 23_t_2 is prevented from moving toward the bent portion 23_t_1 by the own weight of the guide 21.

As described above, in the present embodiment, as illustrated in FIG. 9, each second receiving portion 23_b_ is downstream from the first receiving portion 23_a_ in the sheet conveyance direction Dc and has the groove provided with the bent portions 23_t_1 and 23_t_2 as a plurality of direction switching portions. According to this configuration, the guide 21 is prevented from falling off from the frame 20 and the above-described conditions are easily satisfied. Note that these conditions may not be satisfied.

Note that the two bent portions 23_t_1 and 23_t_2 in the example of FIG. 9 have a shape bent at right angles but the shape is not limited to the shape bent at right angles. For example, bent portions may be bent at an angle greater than a right angle.

Figure 11:
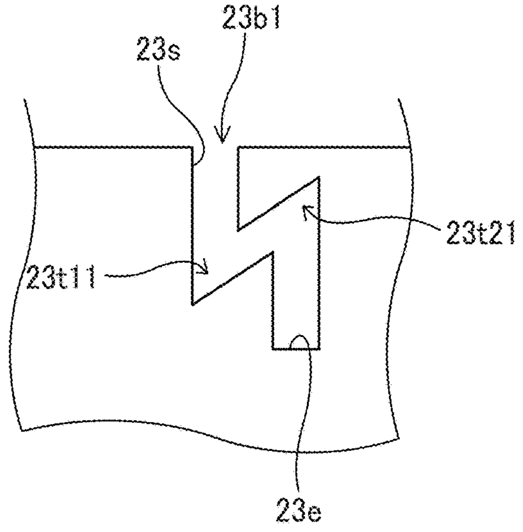
FIG. 11 is a diagram illustrating another example of the shape of the groove of the second receiving portion formed in the frame according to the present embodiment.

Specifically, FIG. 11 is a diagram illustrating another example of the shape of the groove of a second receiving portion 23_b_1 formed in the frame according to the present embodiment.

As illustrated in FIG. 11, the second receiving portion 23_b_1 has two bent portions 23_t_11 and 23_t_21 that are bent at an angle greater than a right angle. Further, the direction switching portion is not limited to a bent shape and may be, for example, a curved shape.

Further, two bent portions, which are the bent portions 23_t_1 and 23_t_2, are provided in the groove of the second receiving portion 23_t_1 in the example of FIG. 9. However, three or more bent portions may be provided.

Figure 12:
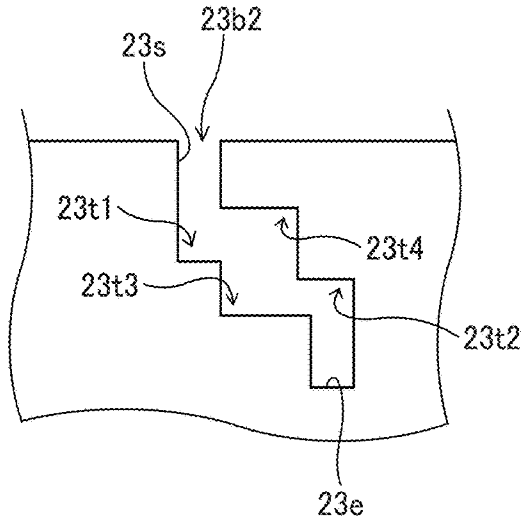
FIG. 12 is a diagram illustrating yet another example of the shape of the groove of the second receiving portion formed in the frame according to the present embodiment.

Specifically, FIG. 12 is a diagram illustrating yet another example of the shape of the groove of a second receiving portion 23_b_2 formed in the frame 20 according to the present embodiment.

As illustrated in FIG. 12, the second receiving portion 23_b_2 may have four bent portions 23_t_1, 23_t_2, 23_t_3, and 23_t_4 in the groove.

Further, in the present embodiment, the first receiving portion 23_a_ positioned upstream from the second receiving portion 23_b_ in the sheet conveyance direction Dc is not provided with such a bent portion as the direction switching portion and is formed in a shape extending linearly from the opening 23_s_ corresponding to the upper end of the groove, to the lower end 23_e_ of the groove. However, to be similar to the second receiving portion 23_b_, the first receiving portion 23_a_ may also have a plurality of bent portions as direction switching portions. However, in order to prevent the guide 21 from falling from the frame 20, it is usually sufficient to provide a plurality of bent portions as direction switching portions in either one of the first receiving portion 23_a_ and the second receiving portion 23_b_ holding both ends of the guide 21.

Rather, when the bent portions as the plurality of direction switching portions are provided in both the first receiving portion 23_a_ and the second receiving portion 23_b_, it is difficult to insert both ends of the guide 21 to the lower end 23_e_ of the groove of each of the first receiving portion 23_a_ and the second receiving portion 23_b_. Similarly, it is difficult to remove both ends of the guide 21 from the opening 23_s_ of each of the first receiving portion 23_a_ and the second receiving portion 23_b_. Therefore, as in the present embodiment, it is preferable that a plurality of bent portions as direction switching portions are provided on the second receiving portion 23_b_ to prevent the guide 21 from falling from the frame 20 and a linear groove shape is employed to the first receiving portion 23_a_ to facilitate the operation of insertion and removal of the guide 21. However, even in this case, it is preferable to provide a cover so that the guide 21 is not easily detached from the first receiving portion 23_a_ having a linear shape of the groove.

Figure 13:
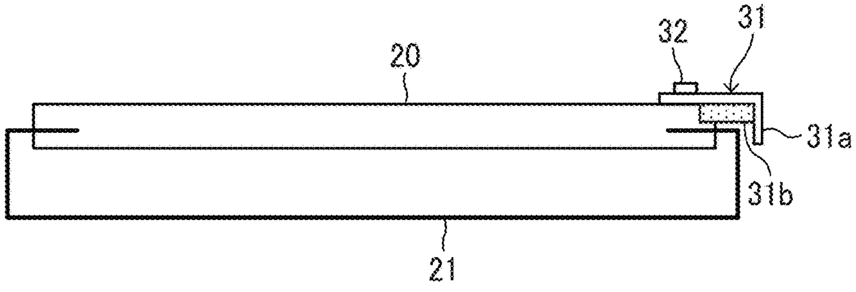
FIG. 13 is a schematic view of the frame holding a guide when viewed from a conveyance direction of the sheet.

FIG. 13 is a schematic view of the frame 20 holding the guide 21, when viewed from the sheet conveyance direction Dc.

Figure 14:
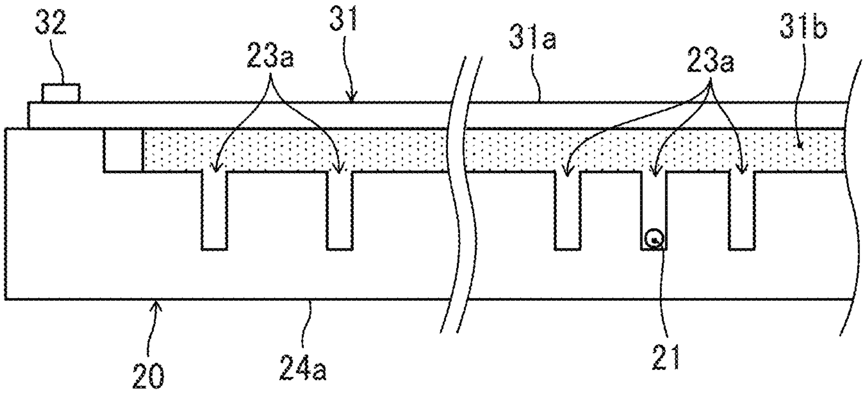
FIG. 14 is a schematic view of the frame holding the guide when viewed from a direction orthogonal to the conveyance direction of the sheet (sheet width direction)

FIG. 14 is a schematic view of the frame 20 holding the guide 21, when viewed from the width direction Db of the sheet Sa that is a direction orthogonal to the sheet conveyance direction Dc.

In the present embodiment, a cover 31 that covers the openings 23_s_ of the first receiving portions 23_a_ is provided for the frame 20 and is fixed to the frame 20 by screws 32. The cover 31 includes a frame portion 31_a_ having high rigidity and an elastic member 31_b_. The elastic member 31_b_ includes sponge or rubber and covers the openings 23_s_ of the first receiving portions 23_a_. To be specific, since the frame portion 31_a_ and the first support 24_a_ of the frame 20 are separated from each other as illustrated in FIG. 14, the elastic member 31_b_ is disposed so as to fill the space between the frame portion 31_a_ and the first support 24_a_ of the frame 20.

By providing the cover 31 as described above, even if the first receiving portion 23_a_ has a linear groove shape, the guide 21 does not come off from the first receiving portion 23_a_. Therefore, even when the guide 21 is pushed and lifted by the floating uppermost sheet S1, the guide 21 is prevented from falling from the frame 20.

Further, when the operator opens the frame 20 by rotating the frame 20 with the hinge mechanisms 22, the operator may grip the first support 24_a_ in which the first receiving portion 23_a_ is formed. At this time, when the cover 31 is not provided and the openings 23_s_ of the first receiving portions 23_a_ are exposed on the upper face of the first support 24_a_, it is likely that the operator may hit the finger or fingers against the edge of the opening 23_s_ to hinder the operability. By providing the cover 31 as in the present embodiment, the operator is protected from hitting the finger or fingers against the edge of the opening 23_s_ of the first receiving portion 23_a_.

Further, in the present embodiment, since the elastic member 31_b_ functions as a portion that covers the openings 23_s_ of the grooves of the first receiving portions 23_a_, when it is desired to change the position of the guide 21 to a different one of the rest of the first receiving portions 23_a_, the position of the guide 21 is allowed to be changed while the cover 31 is fixed. That is, when the operator lifts the guide 21 by the end attached to the first receiving portion 23_a_, the elastic member 31_b_ is deformed by the guide 21, and the guide 21 is pulled up from the opening 23_s_ of the first receiving portion 23_a_. Then, by moving the elastic member 31_b_ between the first support 24_a_ of the frame 20 and the elastic member 31*b* while deforming the elastic member 31*b*, the guide 21 is moved to the opening 23*s* of the different one of the rest of the first receiving portions 23*a* and inserted into the lower end 23*e* of the groove of the different one of the rest of the first receiving portions 23*a*. By so doing, the position of the guide 21 is changed.

A description is given of an example of the specific procedures of changing the position of the guide 21.

In the present embodiment, as illustrated in FIGS. 7A and 7B, when the guide 21 that is placed according to the sheet width is moved from the first receiving portion 23*a* and the second receiving portion 23*b* to another first receiving portion 23*a* and another second receiving portion 23*b*, the operator generally performs the operation while standing on the upstream side of the sheet conveying device 1 in the sheet conveyance direction, that is, on the right side of the sheet conveying device 1 in FIG. 1. In other words, as illustrated in FIGS. 3 and 4, when the sheet feeder 6 is pulled out from the housing 1*p* of the sheet conveying device 1, the operator stands near the end fence 27 (upstream side in the sheet conveying direction) to perform the operation.

As illustrated in FIG. 3, the operator grips one end of the guide 21 attached to the first receiving portion 23*a* close to the end fence 27. The one end of the guide 21 corresponds to the upstream end of the guide 21 in the sheet conveying direction Dc.

Figure 15:
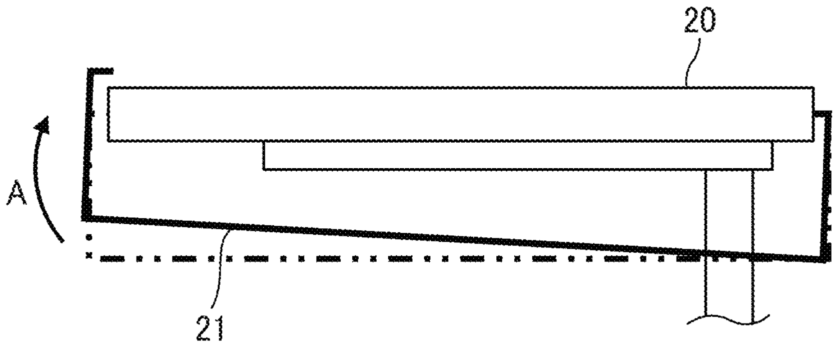
FIG. 15 is a diagram illustrating movement of the guide when an operator changes the position of the guide.

FIG. 15 is a diagram illustrating movement of the guide 21 when an operator changes the position of the guide 21.

As illustrated in FIG. 15, the guide 21 is rotated so that the opposite end of the guide 21 moves upward as indicated by arrow A in FIG. 15, with the one end functioning as a fulcrum. The opposite end of the guide 21 corresponds to the downstream end of the guide 21 in the sheet conveyance direction Dc. At this time, since the operator usually cannot reach the opposite end of the guide 21, the operator grips the one end of the guide 21 alone and rotates the guide 21.

As described above, the second receiving portion 23*b* to which the opposite end of the guide 21 is attached has a shape of the groove including the two bent portions 23*t*1 and 23*t*2. Since this second receiving portion 23*b* has the shape of the groove including the two bent portions 23*t*1 and 23*t*2, when rotating the guide 21, the operator handles the one end of the guide 21 so that the opposite end of the guide 21 moves along the groove shape to come out from the opening 23*s*. The openings 23*s* of the second receiving portions 23*b* are not covered by, for example, a cover such as the cover 31 and are left open. Therefore, it is easy to handle the one end of the guide 21, remove the opposite end of the guide 21 from the opening 23*s* of the second receiving portion 23*b*, and move the guide 21 to the opening 23*s* of a different one of the rest of the second receiving portions 23*s*.

When the opposite end of the guide 21 is moved to the opening 23*s* of the different one of the rest of the second receiving portions 23*b*, the operator handles the one end of the guide 21 to move the opposite end of the guide 21 from the opening 23*s* to the lower end 23*e* of the different one of the rest of the second receiving portions 23*b*. Since this second receiving portion 23*b* also has a shape of the groove including two bent portions 23*t*1 and 23*t*2, the operator handles one end of the guide 21 so that the opposite end of the guide 21 moves along the groove shape and reaches the lower end 23*e*.

Figure 16:
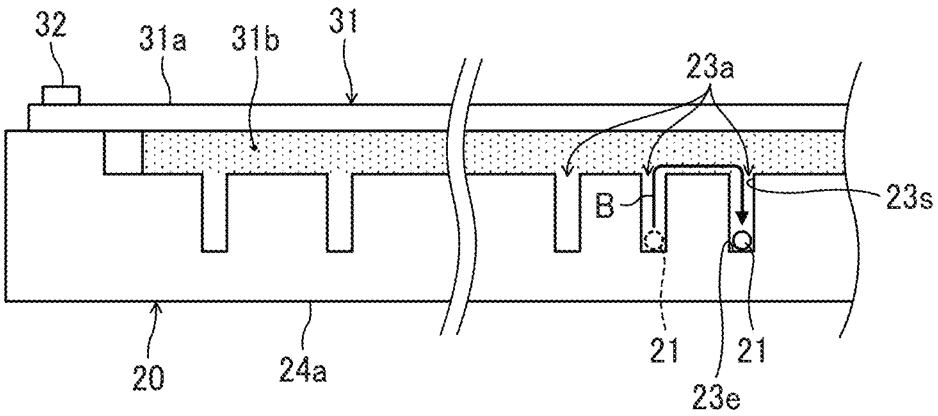
FIG. 16 is a diagram illustrating subsequent movement of the guide when an operator changes the position of the guide.

Next, FIG. 16 is a diagram illustrating subsequent movement of the guide 21 when an operator changes the position of the guide 21.

As indicated by arrow B in FIG. 16, the operator lifts the one end of each guide 21 upward to remove the guide 21 from the opening 23*s* of one of the first receiving portions 23*a*, and then moves the one end of the guide 21 to the openings 23*s* of a different one of the rest of the first receiving portions 23*a* while deforming the elastic member 31*b* of the cover 31. Then, the one end of the guide 21 is lowered from the opening 23*s* to the lower end 23*e* of the different one of the rest of the first receiving portions 23*a*. As a result, the change of the guides 21 is completed.

Figure 17:
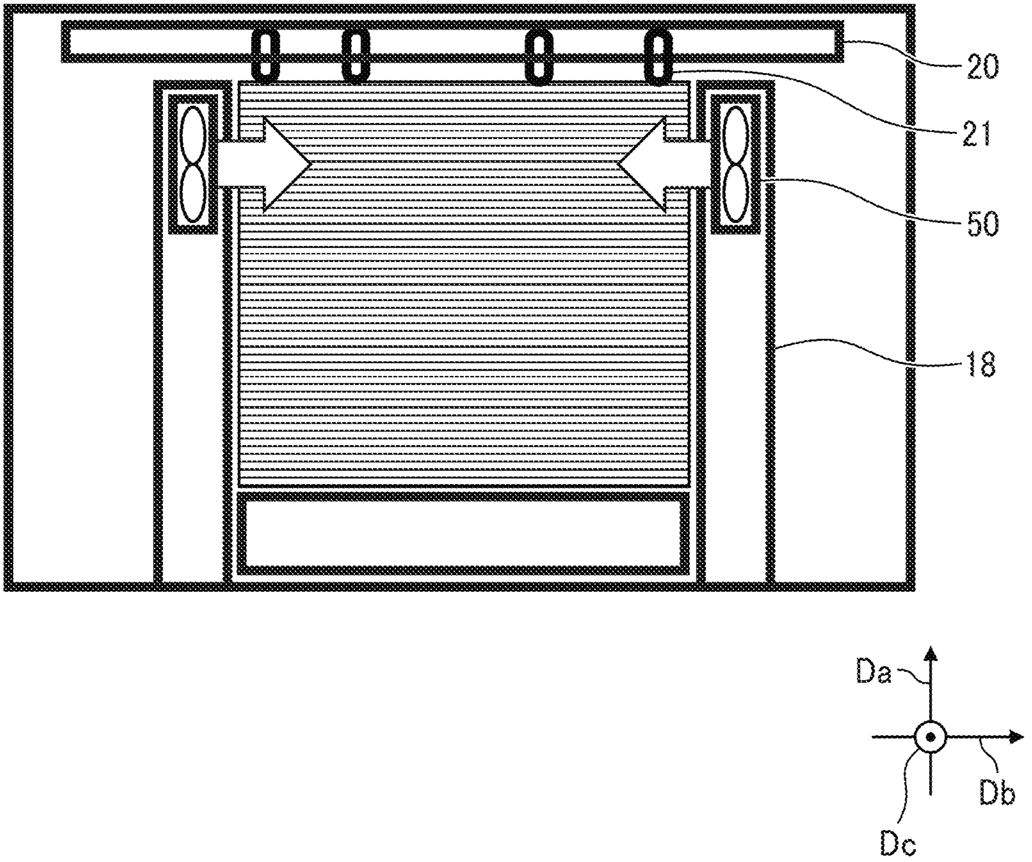
FIG. 17 is a diagram illustrating a modification of an air blowing device (air blower)

FIG. 17 is a diagram illustrating a modification of an air blowing device (air blower).

As illustrated in FIG. 6, the air blowing device 28 (air blower) is on the downstream side (leading end side) of the sheet S in the sheet conveyance direction Dc. On the other hand, in FIG. 17, an air blowing device 50 is provided in each of the pair of side walls 18, so that air is blown from both sides in the sheet width direction Db. In addition to the leading end side in FIG. 6, air may be blown from both sides in the sheet width direction Db.

Figure 18A:
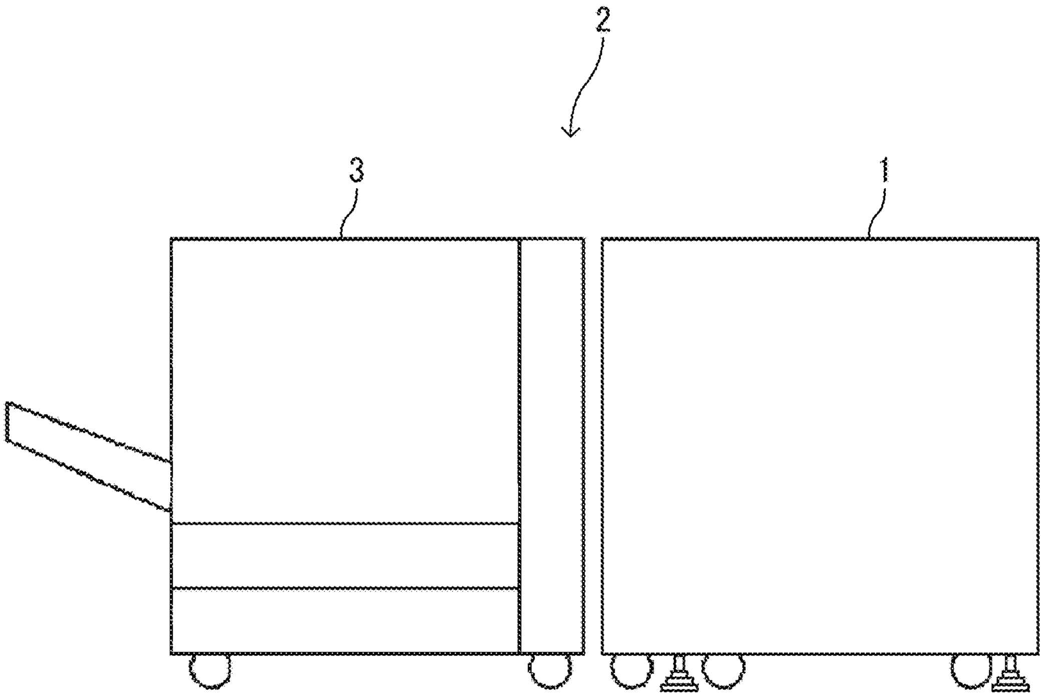
FIG. 18A is a diagram illustrating an example of an electrophotographic image forming system that forms an image with toner.
Figure 18B:
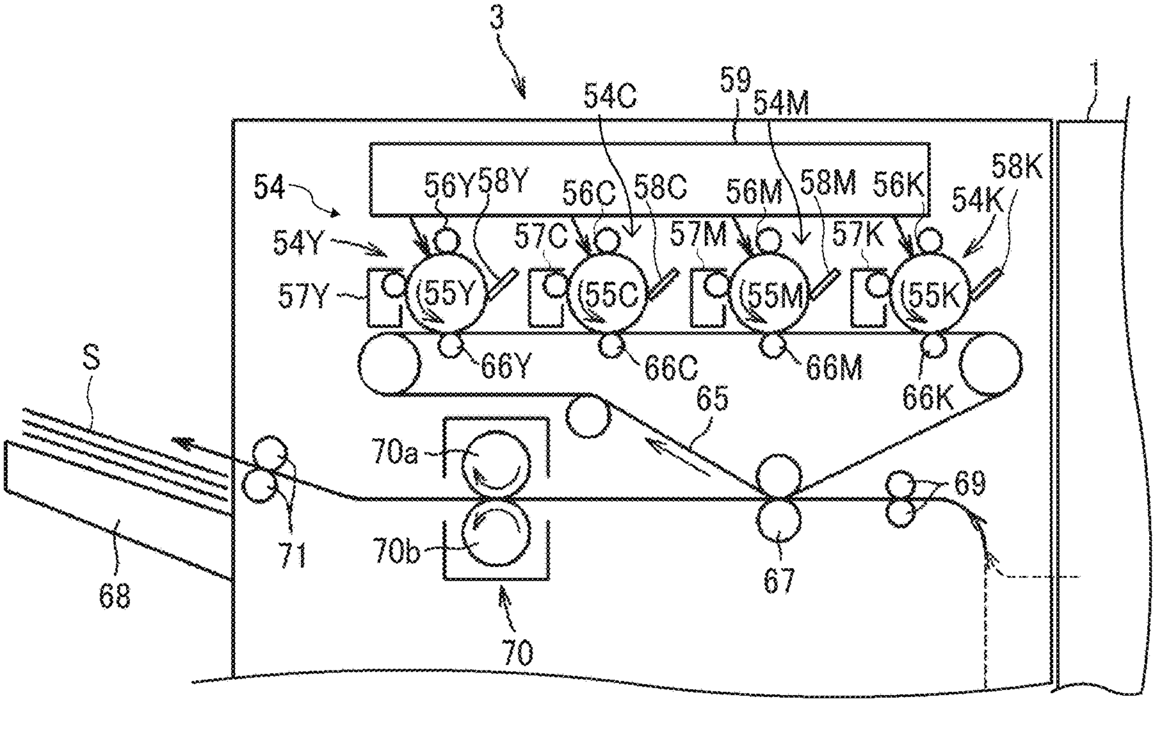
FIG. 18B is a diagram illustrating another example of an electrophotographic image forming system that forms an image with toner.

FIGS. 18A and 18B are diagrams, each illustrating an example of an electrophotographic image forming system that forms an image with toner.

FIG. 18A is a schematic diagram of a configuration of the image forming system 2 including the sheet conveying device 1 and the image forming apparatus 3.

FIG. 18B is a schematic diagram of an inner configuration of the image forming apparatus 3 of FIG. 18A.

In FIG. 18B, the image forming apparatus 3 is a tandem-type color image forming apparatus of an intermediate transfer system in which an image forming device includes four photoconductors.

The image forming device 54 is a tandem image forming apparatus in which a plurality of image forming units 54Y, 54M, 54C, and 54K that correspond to yellow (Y), magenta (M), cyan (C), and black (K) colors, respectively, are arranged along the rotational direction of an intermediate transfer belt 65 that serves as an intermediate transferor. The image forming units 54Y, 54M, 54C, and 54K are provided with a plurality of photoconductors 55Y, 55M, 55C, and 55K that serve as latent-image bearers, respectively. The image forming device 54 further includes image forming components, which are charging devices 56Y, 56M, 56C, and 56K, developing devices 57Y, 57M, 57C, and 57K, cleaning devices 58Y, 58M, 58C, and 58K, primary transfer units 66Y, 66M, 66C, and 66K, and an optical writing device 59. Each of the charging devices 56Y, 56M, 56C, and 56K functions as a charger that uniformly charges the surface of corresponding one of the photoconductors 55Y, 55M, 55C, and 55K at a predetermined level of electrical potential. The optical writing device functions as an electrostatic latent image forming unit that expose the surface of corresponding one of the photoconductors 55Y, 55M, 55C, and 55K and writes an electrostatic latent image on the surface of the corresponding one of the photoconductors 55Y, 55M, 55C, and 55K whose surfaces have been uniformly charged by the charging devices 56Y, 56M, 56C, and 56K according to the image data. Each of the developing devices 57Y, 57M, 57C, and 57K forms a toner image through the developing process in which toner of corresponding one of the yellow (Y), magenta (M), cyan (C), and black (K) colors is made adhered to the electrostatic latent image formed on the corresponding one of the photoconductors 55Y, 55M, 55C, and 55K. Each of the primary transfer units 66Y, 66M, 66C, and 66K functions as a primary transfer unit that transfers the toner image formed on each one of the photoconductors 55Y, 55M, 55C, and 55K onto the intermediate transfer belt 65. Each of the cleaning devices 58Y, 58M, 58C, and 58K functions as a cleaner that removes and cleans the transfer residual toner remaining on each one of the photoconductors 55Y, 55M, 55C, and 55K.

The color toner images that are formed on the respective photoconductors 55Y, 55M, 55C, and 55K are primarily transferred onto the intermediate transfer belt 65 by the primary transfer units 66Y, 66M, 66C, and 66K in the primary transfer process so as to be superimposed on top of one another. As the intermediate transfer belt 65 rotates, the color toner image that is formed on the intermediate transfer belt 65 is conveyed to the opposing area where the intermediate transfer belt 65 and the secondary transfer device 67 face each other. The above opposing area may be referred to as a secondary transfer area in the following description.

On the other hand, a sheet feeding device is disposed in the lower part of the image forming apparatus 3. The sheet feeding device serves as a sheet feeder that feeds a sheet S to bear the color toner image. Accordingly, the sheet S is conveyed to the secondary transfer area through a conveyance roller pair 69 along the conveyance passage indicated by the broken lines in FIG. 18B.

The color toner image that is formed on the intermediate transfer belt 65 is transferred onto the sheet S, which is conveyed through the conveyance roller pair 69 at a predetermined timing, at the secondary transfer area by a secondary transfer device 67 in the secondary transfer process. The sheet S on which the color toner image is formed is then conveyed to a fixing device 70 that serves as a fixing unit, and heat and pressure are applied by a fixing roller 70*a* and a pressure roller 70*b*, respectively, to the sheet S to fix the color toner image onto the sheet S. The sheet S on which the color toner is fixed is conveyed along the conveyance passage indicated by the broken lines in FIG. 18B, then is ejected by a sheet ejection roller pair 71 to a sheet ejection tray 68 that serves as a sheet ejection unit.

Although FIGS. 1, 18A, and 18B illustrate an image forming system in which the sheet conveying device 1 and the image forming apparatus 3 are separated from each other, the sheet conveying device according to the present embodiment is applied to an image forming system in which the sheet conveying device 1 and the image forming apparatus 3 are integrated with each other, that is, the sheet conveying device is incorporated in the housing of the image forming apparatus.

Although specific embodiments and variations are described, the embodiments and variations according to the present disclosure are not limited to those specifically described herein. Several modes of the sheet conveying device are exemplified as follows.

First Mode

In the first mode, a sheet conveying device (for example, the sheet conveying device 1) includes a sheet stacker (for example, the sheet stacker 15), an air blower (for example, the air blowing devices 28, 50), a guide (for example, the guide 21), and a holder (for example, the frame 20). The sheet stacker stacks sheets (for example, the sheet S). The air blower blows air to the sheets on the sheet stacker. The guide is disposed facing an uppermost sheet (for example, the uppermost sheet S1) of the sheets (for example, the stack of sheets S) on the sheet stacker. The holder holds the guide and has a groove (for example, the second receiving portion 23*b*) along which the guide is inserted. The groove has a plurality of direction switching portions (for example, the bent portions 23*t*1, 23*t*2) at each of which the guide changes a direction of movement when the groove receives the guide.

According to the first mode, even if the guide inserted in the groove moves toward an opening (for example, the opening 23*s*) of the groove, the wall surface of a corresponding one of the plurality of direction switching portions contacts the guide to hinder movement of the guide toward the opening. By providing the plurality of direction switching portions, the guide is less likely to move toward the opening when compared with the holder having a single direction switching portion. According to the present mode, the guide is prevented from coming off from the groove.

Second Mode

In the second mode according to the first mode, the holder is movably disposed in the sheet stacker between a first position (for example, the facing position) at which the guide faces the uppermost sheet on the sheet stacker and a second position (for example, the retreated position) at which the guide is retreated from the first position.

In the second mode, since the holder moves between the first position and the second position, the direction of the groove formed in the holder changes in accordance with this movement of the holder. For this reason, due to the external force applied in the movement of the holder or the weight of the guide, the guide is likely to detach (come off) from the groove. According to the second mode, since the plurality of direction switching portions are provided in the groove and the guide is prevented from coming off the groove, the guide may also be prevented from coming off the groove even in a configuration in which the holder moves in this manner.

Third Mode

In the third mode according to the first mode or the second mode, the sheet conveying device (for example, the sheet conveying device 1) further includes a cover (for example, the cover 31) on the holder (for example, the frame 20). The holder includes a first groove (for example, the first receiving portions 23*a*) and a second groove (for example, the second receiving portions 23*b*). The first groove receives an end of the guide (for example, the guide 21) in a longitudinal direction of the guide. The first groove extends linearly and has an opening (for example, the openings 23*s*) covered by the cover. The second groove receives an opposite end of the guide in the longitudinal direction. The second groove has the plurality of direction switching portions (for example, the bent portions 23*t*1, 23*t*2) at each of which the guide changes the direction of movement when the second groove receives the guide.

In the third mode, one of the first groove into which one end of the guide is inserted and the second groove into which the opposite end of the guide is inserted has a plurality of direction switching portions (that is, the second groove), so that the guide is prevented from coming off from the groove. Further, in the third mode, the opposite one of the first groove and the second groove (that is, the first groove) extends linearly. When a plurality of direction switching portions are provided in both the first groove and the second groove, it is difficult to insert the guide into the groove or remove the guide from the groove. By contrast, in this mode, the different groove (the first groove) extends linearly. This configuration allows the operator to easily insert the guide into the groove or remove the guide from the groove.

Furthermore, even though the guide easily comes off from the first groove that extends linearly, the opening of the first groove is covered by the cover. According to this configuration, the guide is prevented from coming off from the first groove.

Fourth Mode

In a fourth mode according to the third mode, the guide (for example, the guide 21) extends in the longitudinal direction along a conveyance direction of the sheet. The first groove (for example, the first receiving portions 23*a*) is upstream from the second groove (for example, the second receiving portions 23*b*) in the conveyance direction of the sheet.

In this case, when the operator inserts the guide into or removes the guide from the upstream side of the sheet conveying device in the sheet conveyance direction, the first groove near the operator is a linear groove. As a result, this configuration according to the sixth mode enhances the operability when the operator grips and moves the end of the guide near the operator.

Fifth Mode

In a fifth mode according to the third mode or the fourth mode, the holder (for example, the frame 20) includes a plurality of first grooves (for example, the first receiving portions 23*a*). The cover (for example the cover 31) includes an elastic member (for example, the elastic member 31*b*).

According to the fifth mode, even when the guide that covers the opening (for example, the opening 23*s*) of the first groove is fixed, the guide is removed from the opening of the first groove by deforming the elastic member or the guide is moved to another first groove.

Sixth Mode

In a sixth mode, an image forming system (for example, the image forming system 2) includes the sheet conveying device (for example, the sheet conveying device 1) according to any one of the first mode to the fifth mode, and an image forming apparatus (for example, the image forming apparatus 3) that forms an image on a sheet (for example, the sheet S). The sheet conveying device and the image forming apparatus are integrated as a single unit or provided separately.

According to the sixth mode, the image forming system including the sheet conveying device that prevents the guide (for example, the guide 21) from detached from the groove is provided.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A sheet conveying device comprising:
a sheet stacker configured to stack sheets;
an air blower configured to blow air to the sheets on the sheet stacker;
a guide disposed facing an uppermost sheet of the sheets on the sheet stacker;
a holder holding the guide and having a groove along which the guide is inserted, and
a cover on the holder,
the groove having a plurality of direction switching portions at each of which the guide changes a direction of movement when the groove receives the guide,
wherein the holder includes
a first groove configured to receive an end of the guide in a longitudinal direction of the guide;
the first groove extending linearly and having an opening covered by the cover; and
a second groove configured to receive an opposite end of the guide in the longitudinal direction, and
the second groove having the plurality of direction switching portions at each of which the guide changes the direction of movement when the second groove receives the guide,
wherein the cover includes an elastic member.

2. The sheet conveying device according to claim 1,
wherein the holder is movably disposed in the sheet stacker between a first position at which the guide faces the uppermost sheet on the sheet stacker and a second position at which the guide is retreated from the first position.

3. The sheet conveying device according to claim 1,
wherein the guide extends in the longitudinal direction along a conveyance direction of the sheet, and
wherein the first groove is upstream from the second groove in the conveyance direction of the sheet.

4. The sheet conveying device according to claim 1,
wherein the holder includes a plurality of first grooves.

5. An image forming system comprising:
the sheet conveying device according to claim 1; and
an image forming apparatus configured to form an image on a sheet,
the sheet conveying device and the image forming apparatus being integrated as a single unit or provided separately.

6. The sheet conveying device according to claim 1, wherein the cover further includes a frame portion, and the elastic member is configured to fill a space between the frame portion and the holder.

* * * * *